US010728820B2

(12) United States Patent
Xu et al.

(10) Patent No.: US 10,728,820 B2
(45) Date of Patent: Jul. 28, 2020

(54) METHOD AND ENB EQUIPMENT FOR SUPPORTING SEAMLESS HANDOVER

(71) Applicant: Samsung Electronics Co., Ltd, Suwon-si (KR)

(72) Inventors: Lixiang Xu, Beijing (CN); Xiaowan Ke, Beijing (CN); Hong Wang, Beijing (CN); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 37 days.

(21) Appl. No.: 16/090,140

(22) PCT Filed: Mar. 31, 2017

(86) PCT No.: PCT/KR2017/003601
§ 371 (c)(1),
(2) Date: Sep. 28, 2018

(87) PCT Pub. No.: WO2017/171506
PCT Pub. Date: Oct. 5, 2017

(65) Prior Publication Data
US 2019/0116536 A1 Apr. 18, 2019

(30) Foreign Application Priority Data

Apr. 1, 2016 (CN) .......................... 2016 1 0204551
May 12, 2016 (CN) .......................... 2016 1 0318090
(Continued)

(51) Int. Cl.
*H04W 36/18* (2009.01)
*H04W 76/20* (2018.01)
(Continued)

(52) U.S. Cl.
CPC ............. *H04W 36/18* (2013.01); *H04W 8/22* (2013.01); *H04W 24/08* (2013.01); *H04W 36/02* (2013.01);
(Continued)

(58) Field of Classification Search
None
See application file for complete search history.

(56) References Cited

U.S. PATENT DOCUMENTS

2012/0218973 A1    8/2012  Du et al.
2012/0287902 A1*  11/2012  Bufe ..................... H04W 76/27
                                                                370/331

(Continued)

FOREIGN PATENT DOCUMENTS

EP    2503820 A1    9/2012
EP    2876932 A1    5/2015
(Continued)

OTHER PUBLICATIONS

European Patent Office, "Supplementary European Search Report," Application No. EP17775930.5, dated Nov. 30, 2018, 12 pages.

(Continued)

*Primary Examiner* — Otis L Thompson, Jr.

(57) ABSTRACT

The present application discloses a method and eNB equipment for supporting seamless handover. The method comprises the following steps of: receiving, by a target eNB, random access information or an RRC connection reconfiguration completion message from a UE; transmitting, by the target eNB, a data transmission stopping indication message to a source eNB; and, stopping, by the source eNB, transmitting downlink data to the UE, and/or stopping, by the source eNB, receiving uplink data from the UE. The present invention further provides several other methods and eNB equipments for supporting seamless handover. By the
(Continued)

methods for supporting seamless handover provided by the present invention, the delay of data transmission and the unnecessary data transmission or unnecessary data monitoring of a source eNB can be avoided, the waste of resources and the power consumption can be reduced, and the missing and duplication transmission of data can be avoided.

14 Claims, 11 Drawing Sheets

(30) Foreign Application Priority Data

Sep. 21, 2016 (CN) .......................... 2016 1 0840088
Sep. 27, 2016 (CN) .......................... 2016 1 0855465

(51) Int. Cl.
| | |
|---|---|
| *H04W 36/02* | (2009.01) |
| *H04W 76/14* | (2018.01) |
| *H04W 76/27* | (2018.01) |
| *H04W 8/22* | (2009.01) |
| *H04W 24/08* | (2009.01) |
| *H04W 52/02* | (2009.01) |
| *H04W 80/02* | (2009.01) |
| *H04W 74/08* | (2009.01) |
| *H04W 80/08* | (2009.01) |

(52) U.S. Cl.
CPC ....... *H04W 52/0206* (2013.01); *H04W 76/14* (2018.02); *H04W 76/20* (2018.02); *H04W 76/27* (2018.02); *H04W 74/0833* (2013.01); *H04W 80/02* (2013.01); *H04W 80/08* (2013.01); *Y02D 70/00* (2018.01)

(56) References Cited

U.S. PATENT DOCUMENTS

| | | |
|---|---|---|
| 2014/0233386 A1 | 8/2014 | Jamadagni et al. |
| 2015/0181470 A1 | 6/2015 | Chai et al. |
| 2015/0264621 A1 | 9/2015 | Sivanesan et al. |
| 2016/0227459 A1 | 8/2016 | Fujishiro et al. |
| 2018/0124656 A1* | 5/2018 | Park ................... H04W 36/0022 |
| 2018/0352481 A1* | 12/2018 | Taguchi ................ H04W 72/04 |
| 2019/0116541 A1* | 4/2019 | Hong .................... H04W 36/36 |
| 2019/0150096 A1* | 5/2019 | Lee ..................... H04W 52/247 370/331 |
| 2019/0208446 A1* | 7/2019 | Peng ................. H04W 36/0016 |
| 2019/0253945 A1* | 8/2019 | Paladugu .......... H04W 12/1006 |

FOREIGN PATENT DOCUMENTS

| | | |
|---|---|---|
| EP | 3397007 A1 | 10/2018 |
| WO | 2015/115621 A1 | 8/2015 |

OTHER PUBLICATIONS

3GPP TR 36.881 V0.6.0 (Feb. 2016), Technical Report, 3rd Generation Partnership Project; Technical Specification Group Radio Access Network; Evolved Universal Terrestrial Radio Access (E-UTRA); Study on latency reduction techniques for LTE (Release 13), Feb. 2016, 92 pages.

International Search Report dated Jun. 29, 2017 in connection with International Patent Application No. PCT/KR2017/003601.

Written Opinion of the International Searching Authority dated Jun. 29, 2017 in connection with International Patent Application No. PCT/KR2017/003601.

* cited by examiner

[Fig. 1]
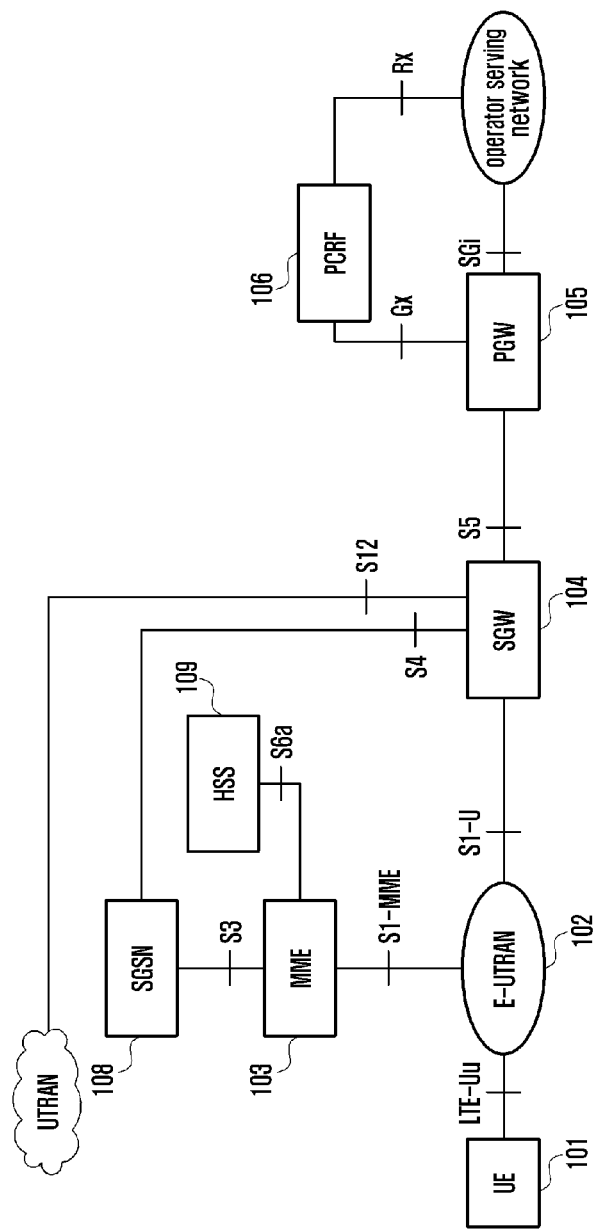

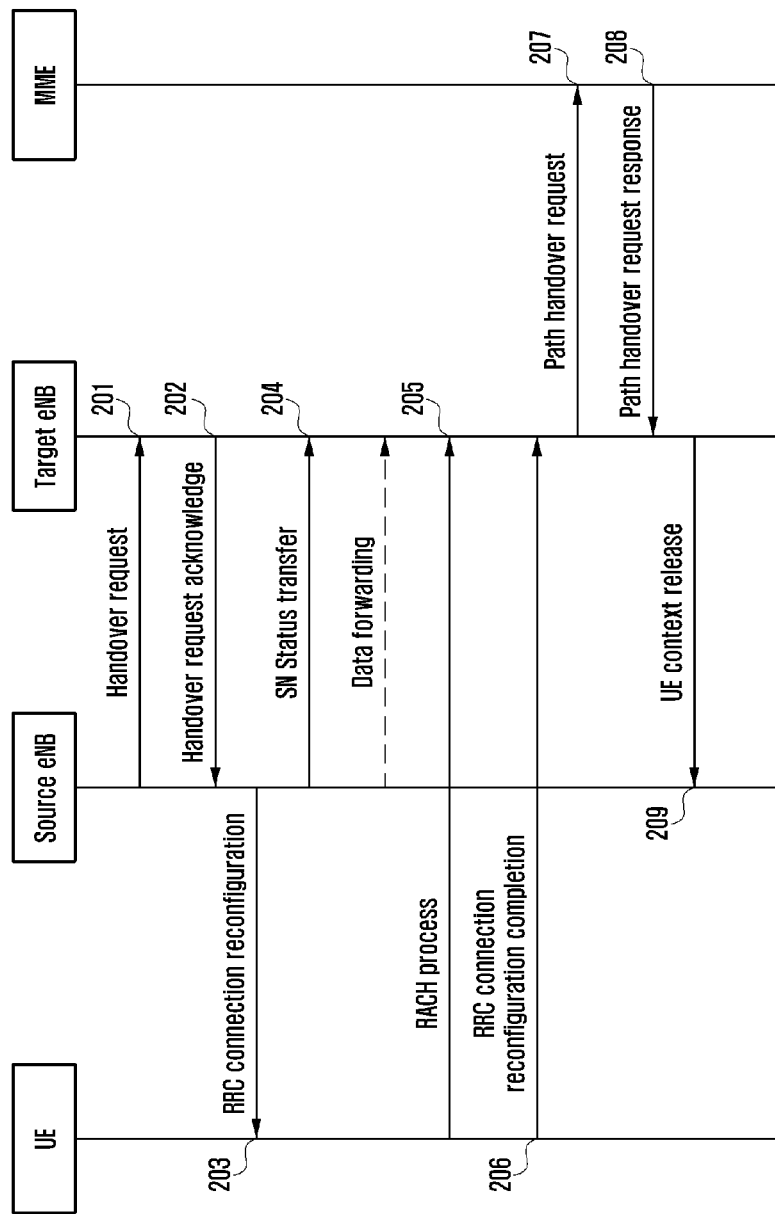
[Fig. 2]

[Fig. 3]
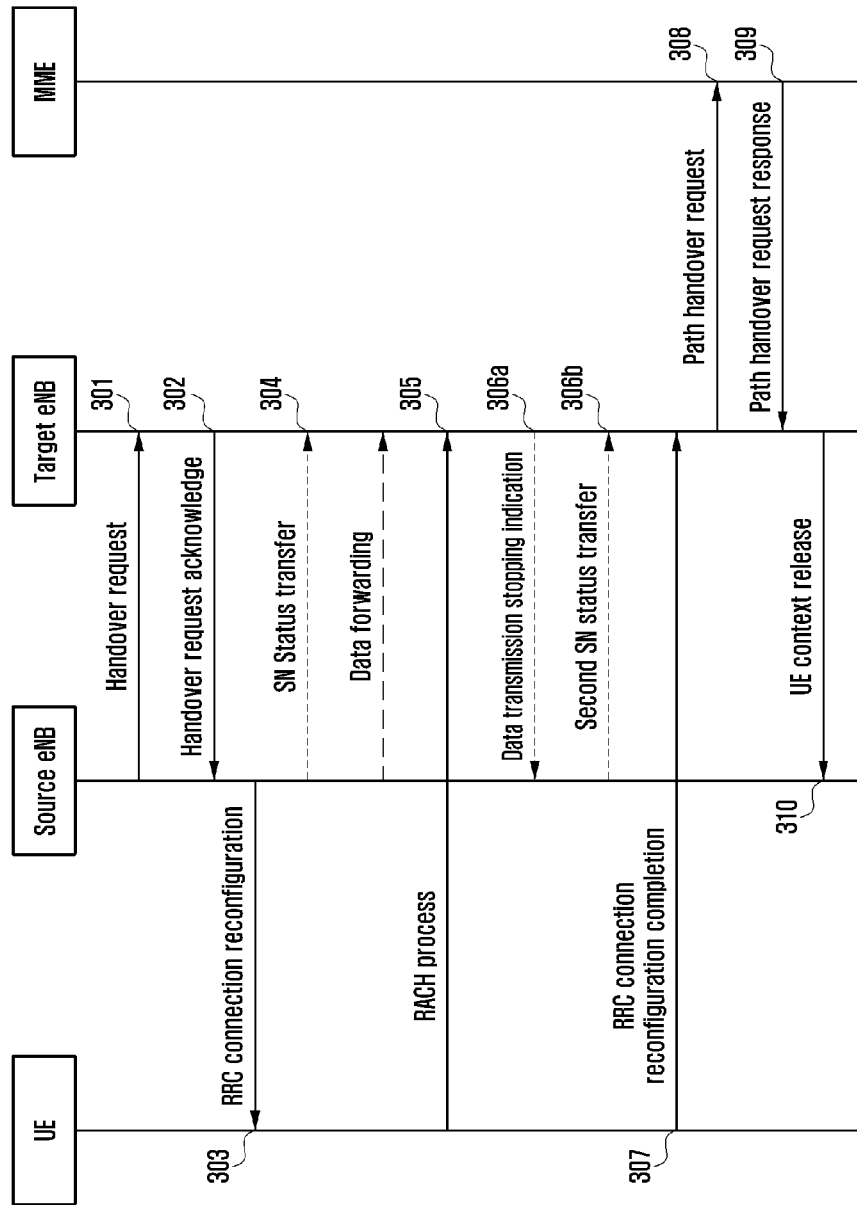

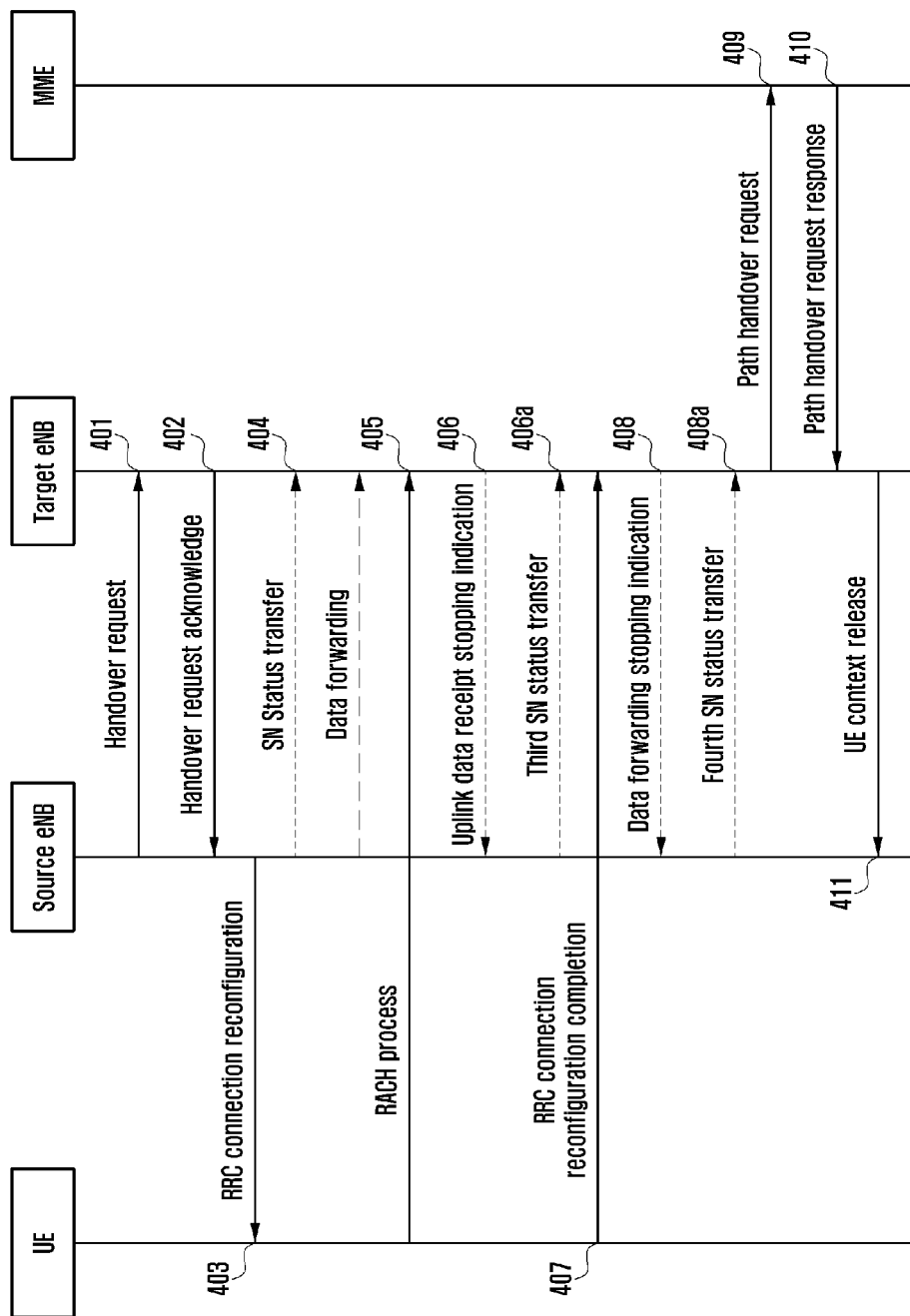
[Fig. 4]

[Fig. 5]
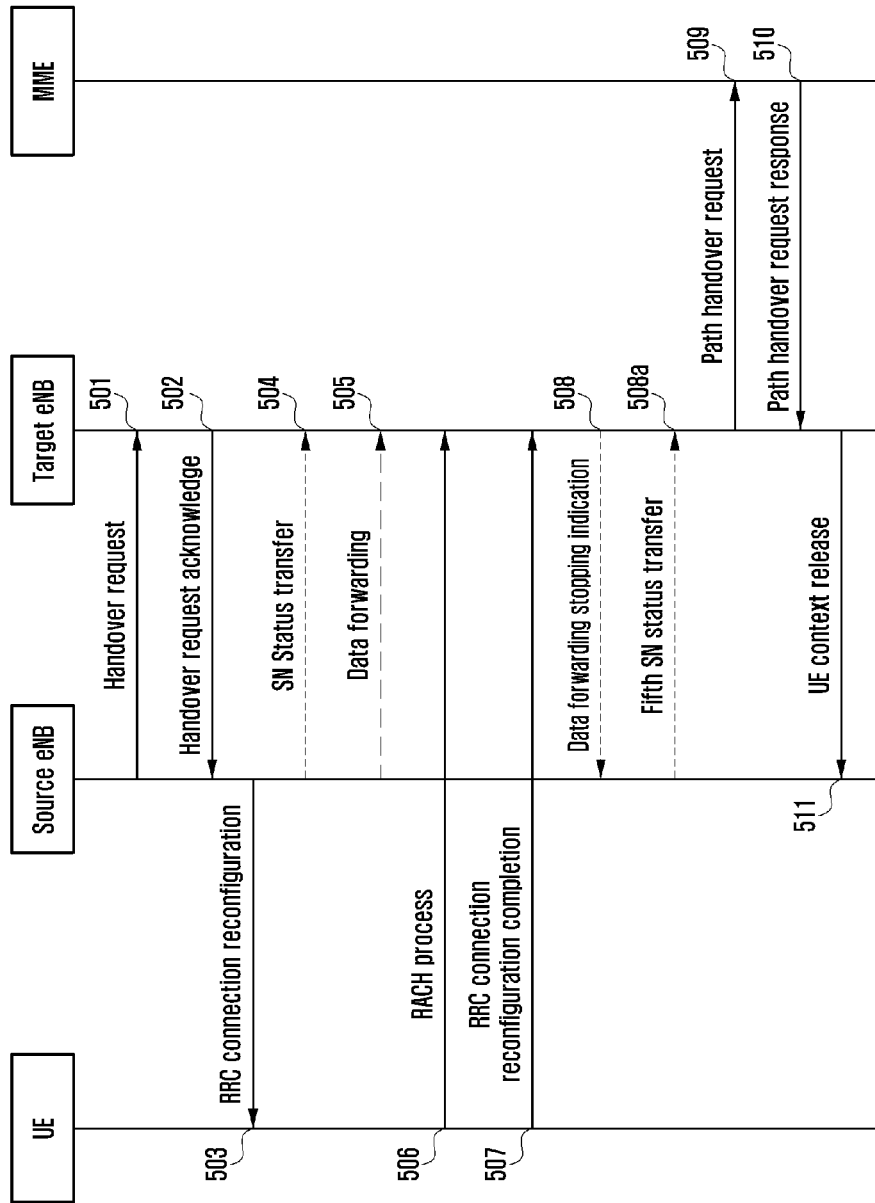

[Fig. 6]
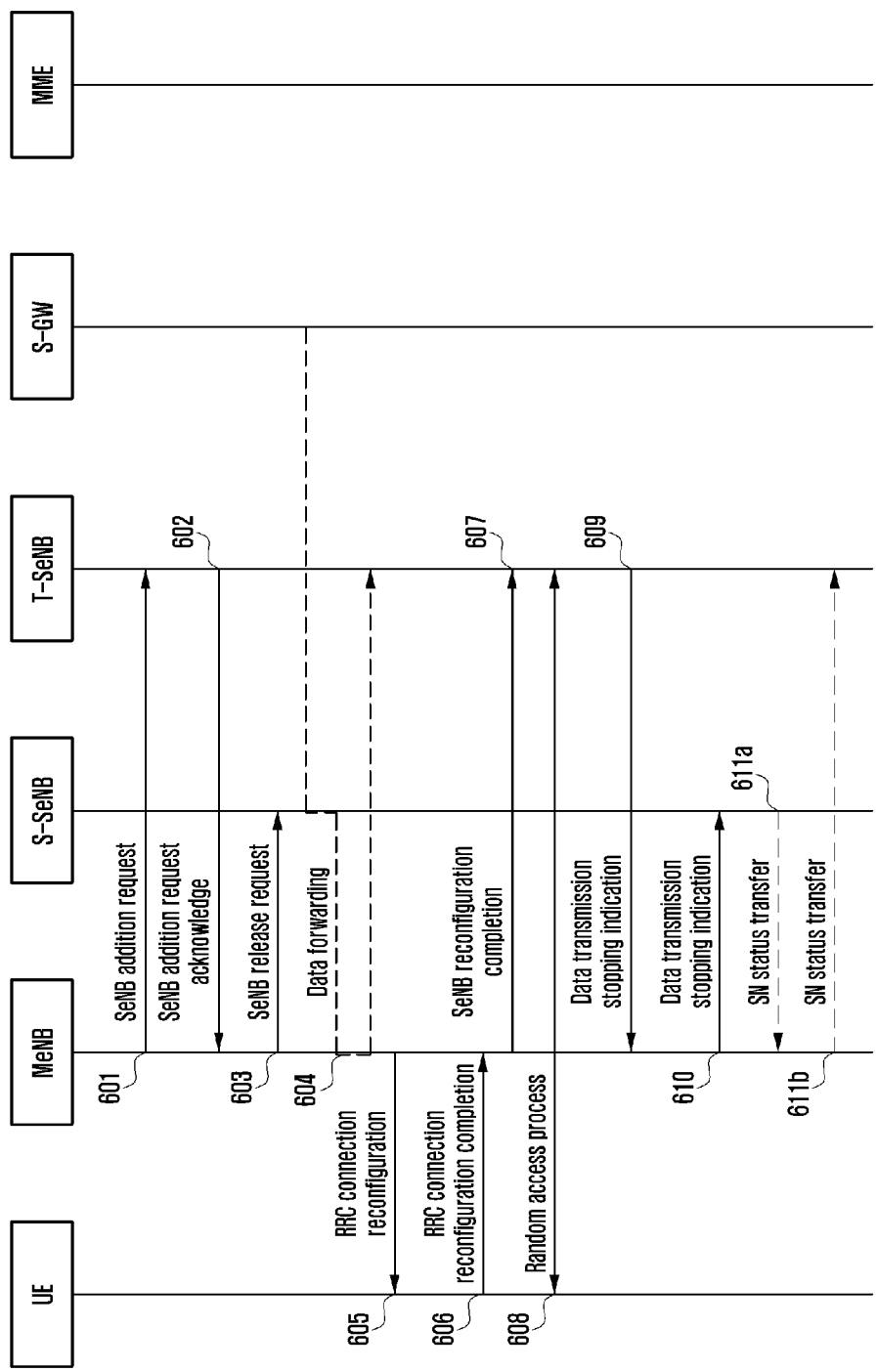

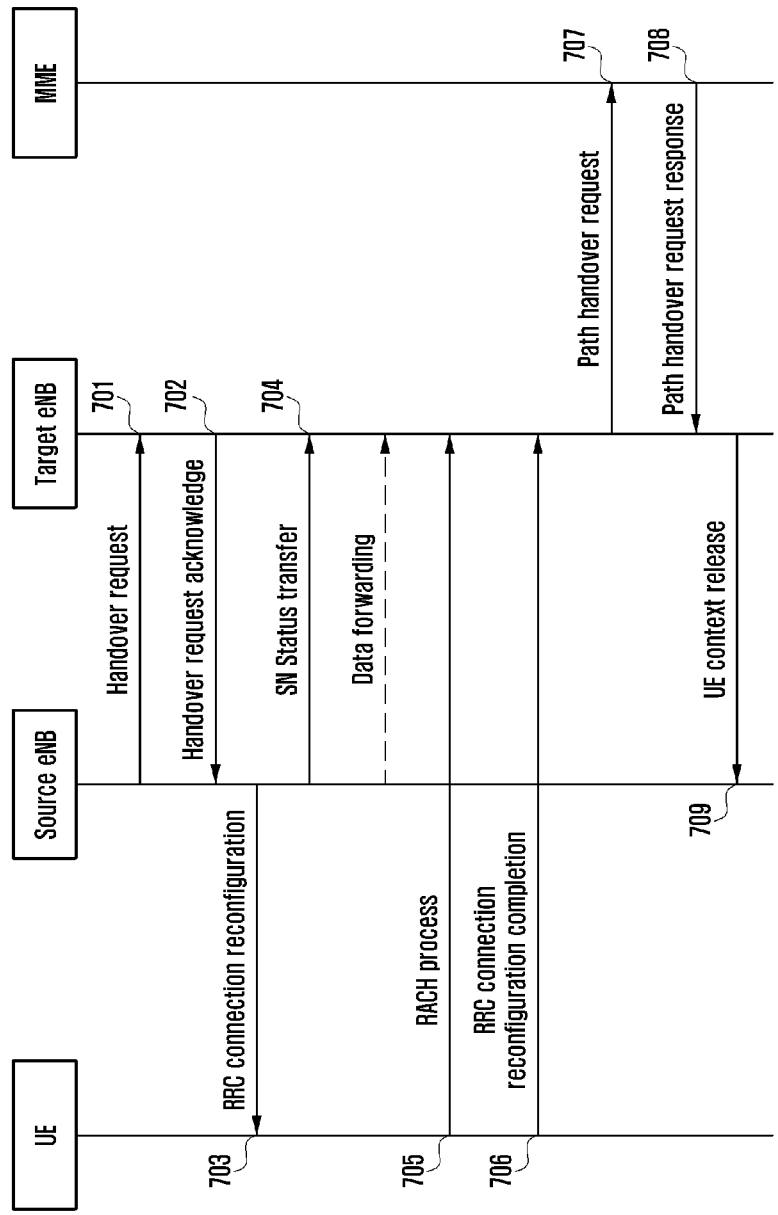
[Fig. 7]

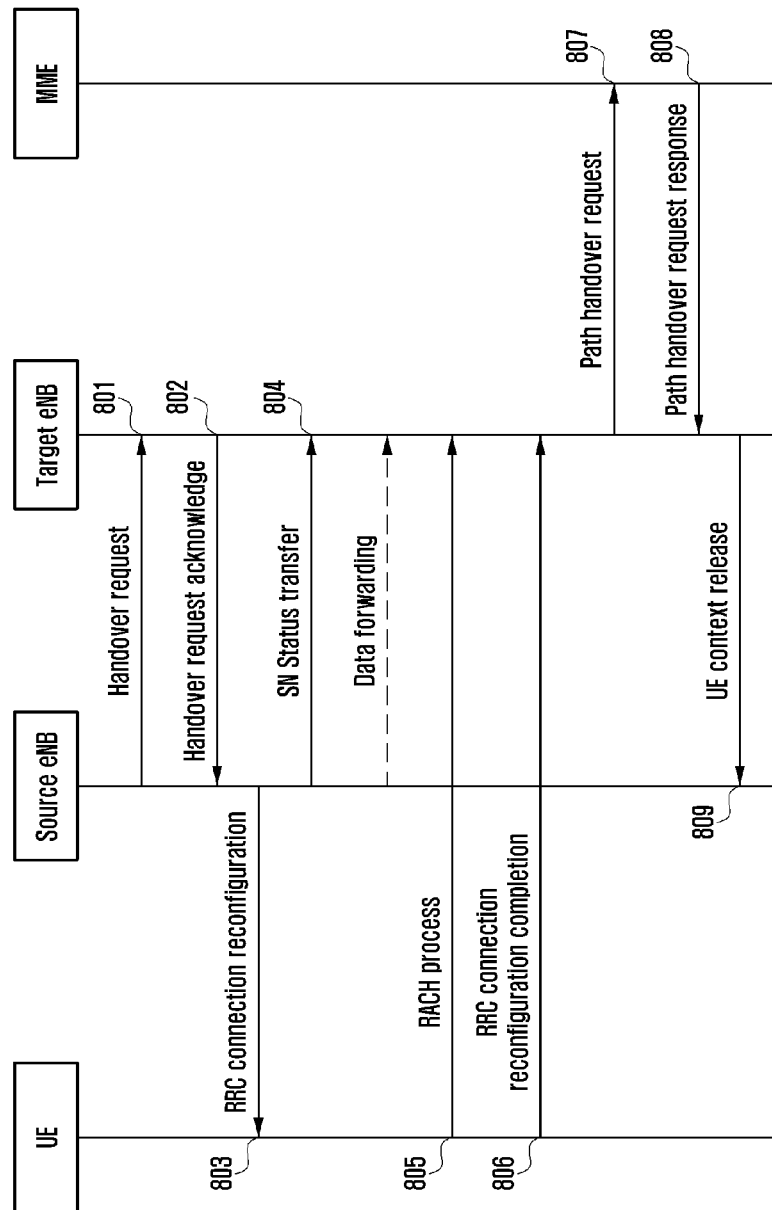
[Fig. 8]

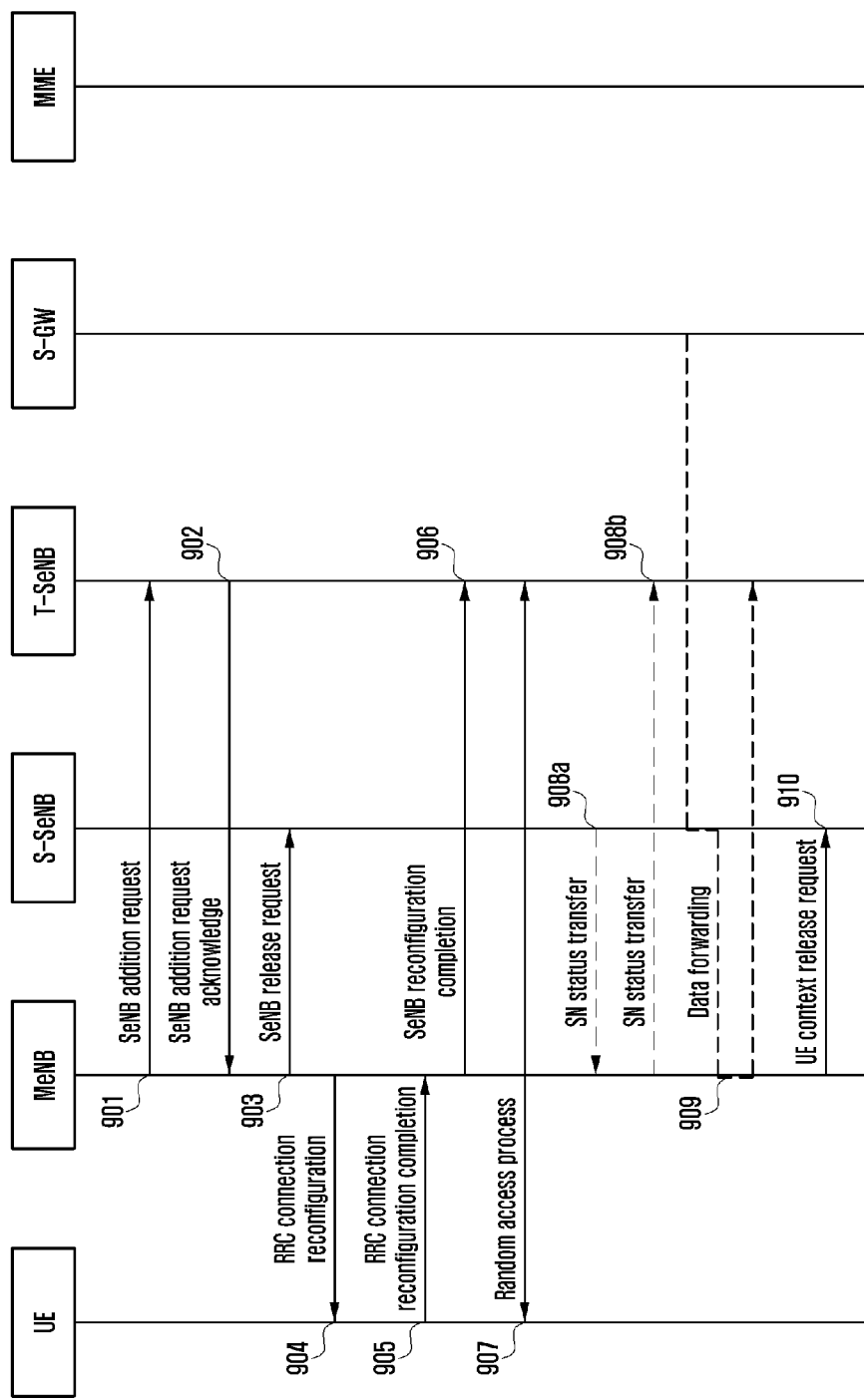
[Fig. 9]

[Fig. 10]
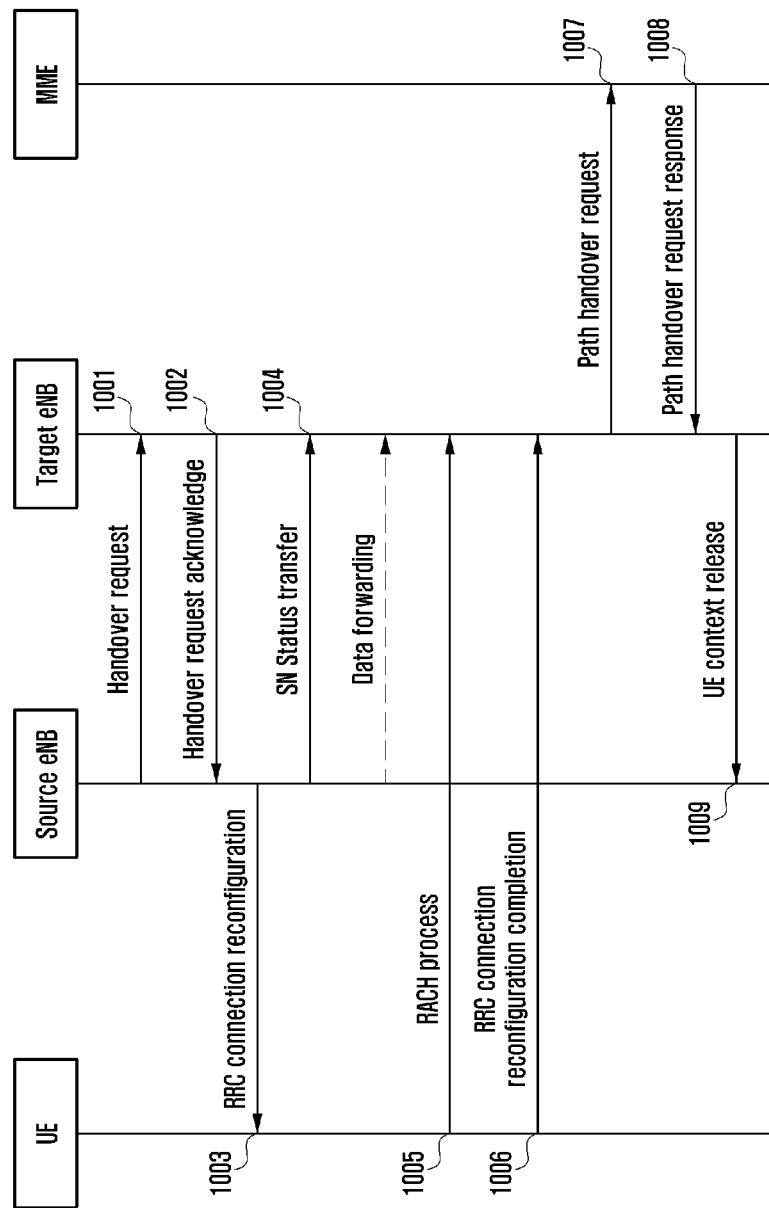

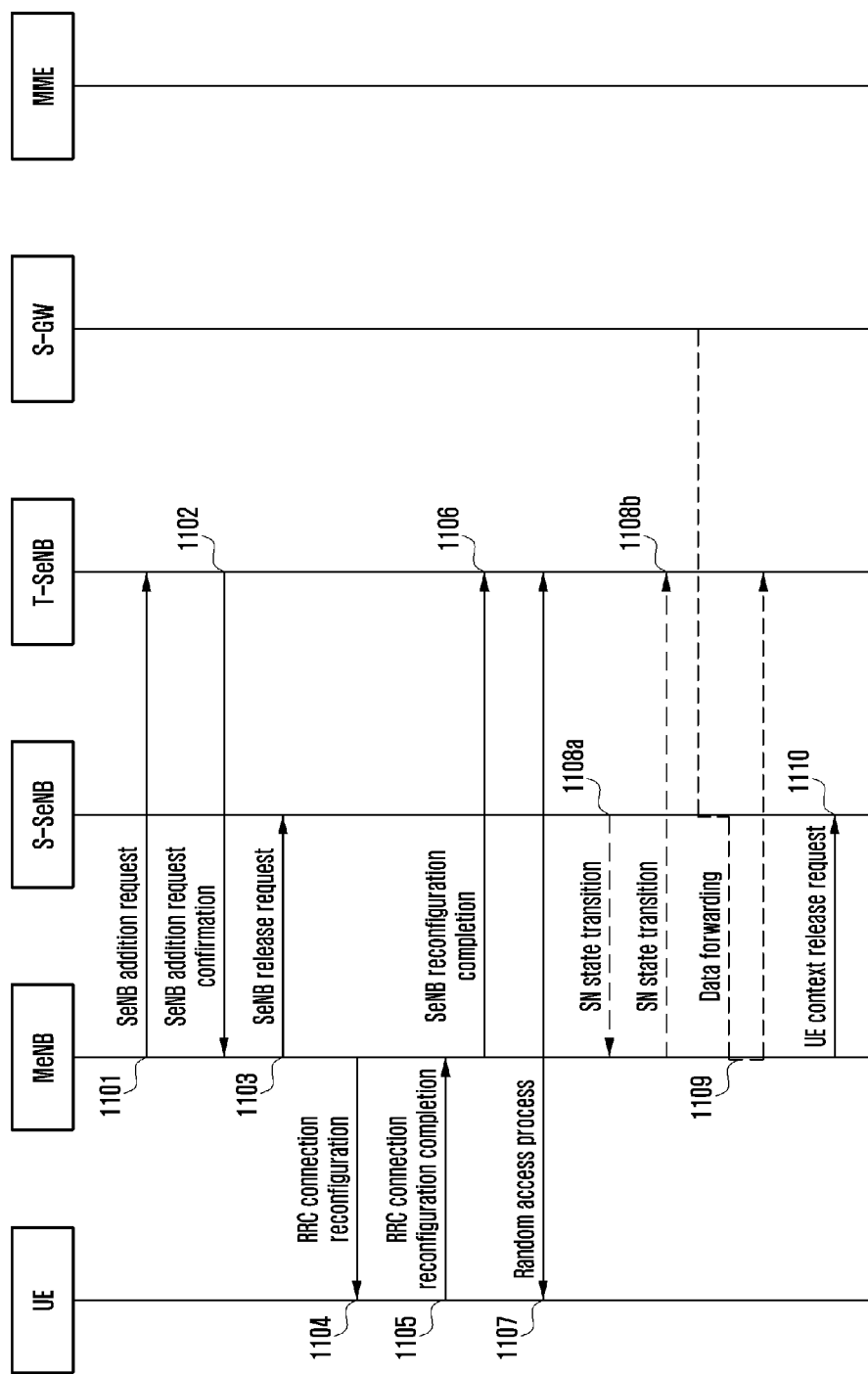
[Fig. 11]

US 10,728,820 B2

METHOD AND ENB EQUIPMENT FOR SUPPORTING SEAMLESS HANDOVER

CROSS-REFERENCE TO RELATED APPLICATIONS

This application is a 371 of International Application No. PCT/KR2017/003601 filed Mar. 31, 2017, which claims priority to Chinese Patent Application No. 201610204551.9 filed on Apr. 1, 2016, Chinese Patent Application No. 201610318090.8 filed on May 12, 2016, Chinese Patent Application No. 201610840088.7 filed on Sep. 21, 2016 and Chinese Patent Application No. 201610855465.4 filed on Sep. 27, 2016, the disclosures of which are herein incorporated by reference in their entirety.

BACKGROUND

1. Field

The present invention relates to wireless communication technologies, and in particular to a method and eNB equipment for supporting seamless handover.

2. Description of Related Art

The modern mobile communication increasingly tends to focus on multimedia services that provide users with high-rate transmission. FIG. 1 is a system architecture diagram showing the System Architecture Evolution (SAE). Wherein:

A User Equipment (UE) 101 is a terminal equipment used for receiving data. An Evolved Universal Terrestrial Radio Access Network (E-UTRAN) 102 is a radio access network in which a macro eNodeB/NodeB providing the UE with an interface for accessing a radio network is included. A Mobility Management Entity (MME) 103 is responsible for managing a movement context, a session context and security information for the UE. A Serving Gateway (SGW) 104 mainly functions to provide a user plane, and the MME 103 and the SGW 104 may be located in a same physical entity. A Packet Data Network Gateway (PGW) 105 is responsible for billing, lawful interception or more, and the PGW 105 and the SGW 104 may also be located in a same physical entity. A Policy and Charging Rules Function Entity (PCRF) 106 provides Quality of Service (QoS) policy and charging rules. A Serving GPRS Support Node (SGSN) 108 is a network node equipment providing routing for data transmission in a Universal Mobile Telecommunication System (UMTS). A Home Subscriber Server (HSS) 109 is a home subsystem of the UE, and is responsible for protecting user information such as the current location of the UE, the address of a serving node, user security information, a packet data context of the UE, or more.

FIG. 2 shows a handover flow according to the present invention. This method comprises the following steps.

Step 201: By a source eNB, a handover request message is transmitted to a target eNB.

Step 202: By the target eNB, a handover request acknowledge message is transmitted to the source eNB.

Step 203: By the source eNB, an RRC connection reconfiguration message is transmitted to a UE. The source eNB stops transmitting downlink data to the UE. The source eNB stops receiving uplink data from the UE. Upon receiving this message, the UE stops receiving the downlink data transmitted by the source eNB and also stops transmitting the uplink data to the source eNB.

Step 204: By the source eNB, a Sequence Number (SN) status transfer is transmitted to the target eNB. The source eNB starts to forward data to the target eNB.

Step 205: The UE is synchronized to the target eNB. The UE accesses to a target cell via a Random Access Channel (RACH).

Step 206: By the UE, an RRC connection reconfiguration completion message is transmitted to the target eNB. The UE starts to transmit and receive data in the target eNB.

Step 207: By the target eNB, a path handover request message is transmitted to an MME.

Step 208: By the MME, a path handover request response message is transmitted to the target eNB.

Step 209: By the target eNB, a UE context release message is transmitted to the source eNB.

From the step 203 to the step 206, the transmission of uplink and downlink data of the UE is interrupted, and as a result, the delay of data transmission is caused. If the source eNB continues transmitting and receiving data after the step 203, the UE also continues receiving the downlink data or transmitting the uplink data at the source eNB between the step 203 and the step 206, and the source eNB does not know when to stop transmitting and receiving data until the step 209, this will cause unnecessary data transmission or unnecessary data monitoring of the source eNB, and result in unnecessary waste of resources and power consumption.

In addition, in a downlink, the source eNB simultaneously transmits data to the UE and the target eNB after the step 203. Since an X2 interface cannot ensure the sequential transmission of data, it is likely to result in the missing or duplicated receipt of data packets, and the UE is unable to detect this case. For example, the source eNB forwards PDCP data packets 10, 11, 12 carrying a Packet Data Convergence Protocol (PDCP) SN and three subsequent PDCP data packets (a, b, c) not carrying a PDCP SN to the target eNB. The source eNB informs the target eNB that the next SN to be used is 13. Since the PDCP data packets are not transmitted sequentially, the order of the three PDCP data packets received by the target eNB is (c, a, b). The correct order should be 10, 11, 12, (a, 13), (b, 14), (c, 15). The actual data packets received by the target eNB are 10, 11, 12, (c, 13), (a, 14), (b, 15). The data packets received from the source eNB by the UE are 10, 11, 12, (a, 13). The UE informs the target eNB that the SN of the next PDCP data packet to be transmitted is 14. Therefore, the target eNB transmits data packets (a, 14), (b, 15) . . . to the UE. Thus, the UE will receive the data packet a twice, but the data packet c is missed. The PDCP of the UE is unable to detect that the data packet a is transmitted repeatedly because the SNs of the two data packets a are different.

In the prior art, the source eNB transmits an SN status transfer message to the target eNB, and the source eNB freezes transmission and receipt. The source eNB informs the target eNB of a next PDCP SN to be used and a corresponding HFN through a DN Count in the SN status transfer message. After the UE is successfully connected to the target eNB, the UE transmits a PDCP status report to the target eNB, so that the target eNB knows the SN of the next PDCP data packet to be transmitted to the UE. Furthermore, an HFN corresponding to the next PDCP data packet is the HFN in the DL count or is smaller 1 than the HFN in the DL count. This is because that the data packet corresponding to the next PDCP SN to be used has not yet been transmitted to the UE (the source eNB has frozen the transmission and receive status when transmitting the SN status transfer message). During the enhanced handover process, upon transmitting the SN status transfer message to the target eNB, the source eNB continues transmitting downlink data to the UE, and meanwhile, the source eNB forwards data to the target eNB. Since some data packets have been received by the UE at the source eNB, these data packets are not to be transmitted repeatedly by the target eNB. After the UE is successfully connected to the target eNB, the target eNB will receive a PDCP status report from the UE, so that the target eNB can know the PDCP SN from which the transmission of data packets to the UE is started. However, the target eNB does not know an HFN corresponding to the next expected PDCP SN received from the UE.

In an uplink, during the existing handover process, the source eNB informs the target eNB of a receive status of an uplink PDCP and an uplink count through an SN status transfer message, and the source eNB stops transmitting downlink data and receiving uplink data. The target eNB knows an uplink transmission status from the source eNB to the SGW. The target eNB informs the UE of the uplink receive status of the source eNB, so that the UE starts the transmission from the next PDCP data packet that has not been received by the source eNB. If the source eNB continues transmitting and receiving data after the step 203, and after the source eNB transmits an SN status transfer message to the target eNB, the UE still transmits the uplink data, and the source eNB still receives the uplink data from the UE. After the UE is successfully synchronized to the target eNB or the RRC reconfiguration is successful, the target eNB does not know the uplink receive status of the source eNB in receiving data from the UE, and also does not know the uplink transmission status from the source eNB to the SGW. The uplink receive status in the SN status transfer message received by the target eNB in the step 204 will be no longer valid, and as a result, the seamless transmission of uplink data cannot be ensured.

SUMMARY

The present invention provides a method and eNB equipment for supporting seamless handover, in order to solve the above-mentioned problems of the delay of data transmission, the unnecessary data transmission or unnecessary data monitoring of a source eNB, and the missing and duplication transmission of uplink and downlink data in the handover process.

The present invention provides a method for supporting seamless handover, comprising the following steps of:

transmitting, by a source eNB, a handover request message to a target eNB;

receiving a handover request acknowledge message transmitted by the target eNB; transmitting an RRC connection reconfiguration message to a UE, continuing transmitting downlink data to the UE, and continuing receiving uplink data transmitted by the UE;

transmitting a Sequence Number (SN) status transfer to the target eNB, and starting to forward data to the target eNB;

receiving a data transmission stopping indication transmitted by the target eNB, and by the source eNB, stopping transmitting the downlink data to the UE and stopping receiving the uplink data from the UE; and receiving a UE context release message transmitted by the target eNB.

Preferably, after the UE is synchronized to the target eNB, the target eNB transmits a data transmission stopping indication to the source eNB.

The data transmission stopping indication is transmitted by the target eNB after the UE is synchronized to the target eNB.

Preferably, the method further comprises the following step of:

transmitting, by the source eNB, a second SN status transfer message to the target eNB.

Preferably, the second SN status transfer message contains:

a receive status of an uplink Packet Data Convergence Protocol Sequence Number (PDCP SN) and/or Hyper-Frame Number (HFN); or a transmission status of a downlink PDCP SN and/or HFN.

Preferably, the second SN status transfer message and the SN status transfer are a same message or different messages; and when the second SN status transfer message is transmitted, it is indicated that the source eNB has frozen the transmission and receive status.

Preferably, the target eNB detects data that is not to be transmitted to the UE in at least one of the following ways:

way 1: according to a transmission status of a PDCP SN and/or HFN received from the source eNB in the second status transfer message, the target eNB discards duplicated data and directly transmits data that has been not received by the UE, where the duplicated data refers to data that is transmitted to the UE and forwarded to the target eNB simultaneously by the source eNB;

way 2: according to a PDCP status report received from the UE, the target eNB detects duplicated data that is not to be transmitted to the UE, then discards the duplicated data and directly transmits data that has been not received by the UE; and way 3: in combination with the second SN status transfer message and the PDCP status report received from the UE, the target eNB detects duplicated data that is not to be transmitted to the UE, then discards the duplicated data and directly transmits data that has been not received by the UE, the second SN status transfer message containing the transmission status of the PDCP SN and/or HFN.

Preferably, after transmitting, by the source eNB, an RRC connection reconfiguration message to a UE or transmitting, by the source eNB, an SN status transfer to the target eNB, the method further comprises the following step of:

feeding, by the source eNB, an uplink data receive status back to the UE.

Preferably, the step of transmitting, by the source eNB, a second SN status transfer message to the target eNB further comprises:

transmitting, by the source eNB, an uplink receive status after stopping receiving the uplink data to the target eNB; or transmitting, by the source eNB, an uplink receive status after stopping receiving the uplink data and an uplink count to the target eNB.

Preferably, after transmitting, by the source eNB, an SN status transfer to the target eNB and before transmitting, by the source eNB, a second SN status transfer message to the target eNB, or, after transmitting, by the source eNB, an SN status transfer to the target eNB and before receiving a data transmission stopping indication transmitted by the target eNB, the method further comprises the following step of:

by the source eNB, transmitting the sequentially received uplink data packets to an SGW, and forwarding other data packets to the target eNB.

Preferably, the process of stopping, by the UE, transmitting uplink data to the source eNB further comprises:

according to the received uplink receive status and in combination with the data that is forwarded by the source eNB and received from the source eNB, transmitting, by the target eNB, the updated uplink receive status to the UE; and according to an end marker, determining, by the target eNB, that the source eNB has forwarded the data.

Preferably, in the step of forwarding, by the source eNB, data to the target eNB, the data is:

an order of forwarded data packets identified by an SN in a GTP-U header; or

PDCP data packets containing an SN, meanwhile, the PDCP data packets containing an SN are transmitted to the UE; or data packets containing a defined Frame Protocol (FP), where a data portion of the FP contains the forwarded PDCP data packets, and a packet header of the FP contains a sequence number of the data packets; or data packets containing a PDCP SN, where a PDCP SN used by the first data packet is a set particular value or set to be dummy; or an estimated number of transmitted data packets after the number of the PDCP data packets is estimated by the source eNB.

Preferably, after transmitting, by the source eNB, an RRC connection reconfiguration message to the UE, the method further comprises:

by the UE, continuing receiving the downlink data transmitted by the source eNB, and continuing transmitting the uplink data to the source eNB; and stopping receiving the downlink data from the source eNB, and stopping transmitting the uplink data to the source eNB, after the UE is synchronized to the target eNB.

An eNB equipment is provided, comprising: a first transmitting module, a first processing module and a first receiving module, wherein:

the first transmitting module is configured to: transmit a handover request message to a target eNB; transmit an RRC connection reconfiguration message to a UE, and continue transmitting downlink data to the UE; and, transmit an SN status transfer to the target eNB, and start to forward data to the target eNB;

the first receiving module is configured to: continue receiving uplink data from the UE; receive a data transmission stopping indication transmitted by the target eNB and indicate the first processing module to perform processing; and, receive a UE context release message transmitted by the target eNB; and the first processing module is configured to, under an indication from the receiving module, control the first transmitting module to stop transmitting the downlink data to the UE and control the first receiving module to stop receiving the uplink data from the UE.

A method for supporting seamless handover is provided, comprising the following steps of:

transmitting, by a target eNB, a handover request acknowledge message upon receiving a handover request message transmitted by a source eNB;

receiving a Sequence Number (SN) status transfer transmitted by the source eNB after transmitting an RRC connection reconfiguration message to a UE;

transmitting, by the target eNB, a data transmission stopping indication to the source eNB after the UE is synchronized to the target eNB;

receiving an RRC connection reconfiguration completion message transmitted by the UE, and transmitting a path handover request message to an MME; and receiving a path handover request response message transmitted by the MME, and transmitting a UE context release message to the source eNB.

Preferably, the method further comprises the following step of:

receiving a second SN status transfer message transmitted by the source eNB; and detecting, by the target eNB, data that is not to be transmitted to the UE in at least one of the following ways:

way 1: according to a transmission status of a PDCP SN and/or HFN received from the source eNB in the second SN status transfer message, the target eNB discards duplicated data and directly transmits data that has been not received by the UE, the duplicated data referring to data that is transmitted to the UE and forwarded to the target eNB simultaneously by the source eNB;

way 2: according to a PDCP status report received from the UE, the target eNB detects duplicated data that is not to be transmitted to the UE, then discards the duplicated data and directly transmits data that has been not received by the UE; and way 3: in combination with the second SN status transfer message and the PDCP status report received from the UE, the target eNB detects duplicated data that is not to be transmitted to the UE, then discards the duplicated data and directly transmits data that has been not received by the UE, the second SN status transfer message containing the transmission status of the PDCP SN and/or HFN.

Preferably, after the UE is synchronized to the target eNB, the method further comprises:

by the UE, stopping receiving downlink data from the source eNB, and stopping transmitting uplink data to the source eNB; and the process of stopping, by the UE, transmitting uplink data to the source eNB further comprises:

according to the uplink receive status fed back by the source eNB and in combination with the data that is forwarded by the source eNB and received from the source eNB, transmitting, by the target eNB, the updated uplink receive status to the UE; and according to an end marker, determining, by the target eNB, that the source eNB has forwarded the data.

An eNB equipment is provided, comprising: a second transmitting module and a second receiving module, wherein:

the second receiving module is configured to: receive a handover request message transmitted by a source eNB; receive an RRC connection reconfiguration message transmitted to a UE by the source eNB; receive an RRC connection reconfiguration completion message transmitted by the UE; and receive a path handover request response message transmitted by an MME; and the second transmitting module is configured to: transmit a handover request acknowledge message to the source eNB; transmit, by a target eNB, a data transmission stopping indication to the source eNB after the UE is synchronized to the target eNB; transmit a path request message to the MME; and transmit a UE context release message to the source eNB.

A method for supporting seamless handover is provided, comprising the following steps of:

by a source eNB, transmitting a handover request message to a target eNB, and receiving a handover request acknowledge message transmitted by the target eNB;

transmitting an RRC connection reconfiguration message to a UE, continuing transmitting downlink data to the UE, and continuing receiving uplink data transmitted by the UE;

transmitting a Sequence Number (SN) status transfer to the target eNB, and starting to forward data to the target eNB;

receiving a data transmission stopping indication transmitted by the target eNB after receiving an RRC connection reconfiguration completion message, and stopping transmitting the downlink data to the UE; and receiving a UE context release message transmitted by the target eNB.

Preferably, the method further comprises the following steps of:

stopping, by the UE, transmitting the uplink data to the source eNB after the UE is synchronized to the target eNB; or by the UE, transmitting an RRC connection reconfiguration completion message to the target eNB, and stopping transmitting the uplink data to the source eNB.

Preferably, the method further comprises the following steps of:

by the source eNB, receiving an uplink data stopping receiving indication transmitted by the target eNB after receiving synchronization information transmitted by the UE, and stopping receiving the uplink data from the UE; and when this step is not executed and by the source eNB, stopping receiving the uplink data from the UE upon receiving the data transmission stopping indication message.

Preferably, the method further comprises the following step of:

transmitting, by the source eNB, a second SN status transfer message to the target eNB, this message containing a receive status of an uplink PDCP SN and/or HFN.

Preferably, after transmitting, by the source eNB, an RRC connection reconfiguration message to a UE or transmitting, by the source eNB, an SN status transfer to the target eNB, the method further comprises the following step of:

feeding, by the source eNB, an uplink data receive status back to the UE.

Preferably, the step of transmitting, by the source eNB, a second SN status transfer message to the target eNB further comprises:

transmitting, by the source eNB, an uplink receive status after stopping receiving the uplink data to the target eNB; or transmitting, by the source eNB, an uplink receive status after stopping receiving the uplink data and an uplink count to the target eNB.

Preferably, after transmitting, by the source eNB, an SN status transfer to the target eNB and before transmitting, by the source eNB, a second SN status transfer message to the target eNB, or, after transmitting, by the source eNB, an SN status transfer to the target eNB and before receiving a data transmission stopping indication transmitted by the target eNB, the method further comprises the following step of:

by the source eNB, transmitting the sequentially received uplink data packets to an SGW, and forwarding other data packets to the target eNB.

Preferably, the process of stopping, by the UE, transmitting uplink data to the source eNB further comprises:

according to the received uplink receive status and in combination with the data that is forwarded by the source eNB and received from the source eNB, transmitting, by the target eNB, the updated uplink receive status to the UE; and by the target eNB, determining, according to an end marker, that the source eNB has forwarded the data, and transmitting a data transmission stopping indication to the source eNB.

Preferably, in the step of forwarding, by the source eNB, data to the target eNB, the data is:

an order of forwarded data packets identified by an SN in a GTP-U header; or

PDCP data packets containing an SN, meanwhile, PDCP data packets containing an SN are transmitted to the UE; or data packets containing a defined Frame Protocol (FP), where a data portion of the FP contains the forwarded PDCP data packets and a packet header of the FP contains a sequence number of the data packets; or data packets containing a PDCP SN, where a PDCP SN used by the first data packet is a set particular value or set to be dummy; or an estimated number of transmitted data packets after the number of the PDCP data packets is estimated by the source eNB.

An eNB equipment is provided, comprising: a third transmitting module, a third processing module and a third receiving module, wherein:

the third transmitting module is configured to: transmit a handover request message to a target eNB; transmit an RRC connection reconfiguration message to a UE, and continue transmitting downlink data to the UE; and, transmit an SN status transfer to the target eNB, and start to forward data to the target eNB;

the third receiving module is configured to: receive a handover request acknowledge message transmitted by the target eNB, and continue receiving uplink data from the UE; receive a data transmission stopping indication transmitted by the target eNB after receiving an RRC connection reconfiguration completion message and indicates the third processing module to perform processing; and, receive a UE context release message transmitted by the target eNB; and the third processing module is configured to, under an indication from the third receiving module, control the transmitting module to stop transmitting the downlink data to the UE and control the third receiving module to stop receiving the uplink data from the UE.

A method for supporting seamless handover is provided, comprising the following steps of:

transmitting, by a target eNB, a handover request acknowledge message upon receiving a handover request message transmitted by a source eNB;

receiving a Sequence Number (SN) status transfer transmitted by the source eNB after transmitting an RRC connection reconfiguration message to a UE;

receiving an RRC connection reconfiguration completion message transmitted by the UE, and transmitting a data transmission stopping indication to the source eNB;

transmitting a path handover request message to an MME; and receiving a path handover request response message transmitted by the MME, and transmitting a UE context release message to the source eNB.

Preferably, the method further comprises the following step of:

stopping, by the UE, transmitting uplink data to the source eNB after the UE is synchronized to a target eNB; or, by the UE, transmitting an RRC connection reconfiguration completion message to the target eNB, and stopping transmitting uplink data to the source eNB; and the process of stopping, by the UE, transmitting uplink data to the source eNB further comprises:

according to the uplink receive status fed back by the source eNB and in combination with the data that is forwarded by the source eNB and received from the source eNB, transmitting, by the target eNB, the updated uplink receive status to the UE; and by the target eNB, determining, according to an end marker, that the source eNB has forwarded the data, and transmitting a data transmission stopping indication to the source eNB.

An eNB equipment is provided, comprising: a fourth transmitting module and a fourth receiving module, wherein:

the fourth transmitting module is configured to: transmit a handover request acknowledge message to a source eNB; transmit a data transmission stopping indication to the source eNB; transmit a path handover request message to an MME; and transmit a UE context release message to the source eNB; and the fourth receiving module is configured to: receive a handover request message transmitted by the source eNB; receive an RRC connection reconfiguration message transmitted to the UE by the source eNB; receive an RRC connection reconfiguration completion message transmitted by the UE; and receive a path handover request response message transmitted by the MME.

A method for supporting seamless handover for dual connectivity is provided, comprising the following steps of:

receiving, by a target eNB, an eNB addition request message transmitted by a Macrocell eNB (MeNB);

transmitting, by the target eNB, an eNB addition request acknowledge message to the MeNB;

if resources for the target eNB are allocated successfully, transmitting, by the MeNB, an eNB release request message to a source eNB, continuing transmitting uplink and downlink data by the source eNB, and forwarding, by the source eNB, data to the target eNB;

by the MeNB, transmitting an RRC connection reconfiguration message to a UE, continuing transmitting downlink data to the source eNB, and forwarding the downlink data to the target eNB;

by the UE, receiving the RRC connection reconfiguration message, not deleting or reconfiguring a configuration for the source eNB, continuing transmitting uplink and downlink data between the UE and the source eNB, and transmitting an RRC connection reconfiguration completion message to the MeNB;

transmitting, by the MeNB, an SeNB reconfiguration completion message to the target eNB;

synchronizing the UE to the target eNB, and stopping transmitting uplink and downlink data between the UE and the source eNB;

transmitting a data transmission stopping indication to the MeNB by the target eNB, and by the MeNB, stopping transmitting downlink data to the source eNB upon receiving the message, and by the MeNB, transmitting the data transmission stopping indication to the source eNB;

transmitting, by the source eNB, an SN status transfer to the MeNB; and transmitting, by the MeNB, the SN status transfer to the target eNB.

It can be seen from the technical solutions that, by the methods for supporting seamless handover provided by the present invention, the delay of data transmission and the unnecessary data transmission or unnecessary data monitoring of a source eNB can be avoided, the waste of resources and the power consumption can be reduced, and the missing and duplicated transmission of data can be avoided.

BRIEF DESCRIPTION OF THE DRAWINGS

FIG. 1 is an architecture diagram of an existing SAE system architecture;

FIG. 2 is a flowchart of an existing handover;

FIG. 3 is a schematic diagram of a first method for supporting seamless handover according to the present invention;

FIG. 4 is a schematic diagram of a second method for supporting seamless handover according to the present invention;

FIG. 5 is a schematic diagram of a third method for supporting seamless handover according to the present invention;

FIG. 6 is a schematic diagram of an embodiment for dual connectivity of the first method for supporting seamless handover according to the present invention;

FIG. 7 is a schematic diagram of a fourth method for supporting seamless handover according to the present invention;

FIG. 8 is a schematic flowchart of a fifth method for supporting seamless handover according to the present invention;

FIG. 9 is a schematic diagram of an embodiment for dual connectivity of the fourth and fifth methods for supporting seamless handover according to the present invention;

FIG. 10 is a schematic diagram of a sixth method for supporting seamless handover according to the present invention;

FIG. 11 is a schematic diagram of an embodiment for dual connectivity of the sixth method for supporting seamless handover according to the present invention.

DETAILED DESCRIPTION

To make the objectives, technical means and advantages of the present application clearer, the present application will be further described below in details with reference to the accompanying drawings.

FIG. 3 shows a first method for supporting seamless handover according to the present invention. This method comprises the following steps.

Step 301: By a source eNB, a handover request message is transmitted to a target eNB.

Step 302: By the target eNB, a handover request acknowledge message is transmitted to the source eNB.

Step 303: By the source eNB, an RRC connection reconfiguration message is transmitted to a UE. The source eNB continues transmitting downlink data to the UE. The source eNB continues receiving uplink data from the UE. Upon receiving this message, the UE continues receiving the downlink data transmitted by the source eNB, and continues transmitting the uplink data to the source eNB.

In order to solve the problem in the uplink data transmission in the present invention, one corresponding method is that the source eNB continues feeding an uplink data receive status back to the UE after this step or after step 304. Thus, the UE knows which data packets have been already received from the UE by the source eNB. Accordingly, upon transmitting a message in step 307, the UE knows a data packet starting from which the data packet should be transmitted to the target eNB.

In order to solve the problem in the uplink data transmission in the present invention, a second method is that the source eNB transmits an uplink receive status after stopping receiving the uplink data to the target eNB via step 306a. Thus, the target eNB can accurately know an uplink receive status of the source eNB after the UE stops transmitting the uplink data, so that the target eNB can inform the UE of this, and the UE then transmits data packets that have not been received by the source eNB to the target eNB. Corresponding to this method, more preferably, step 304 can be omitted and not be executed. The source eNB transmits an uplink count after stopping receiving the uplink data to the target eNB via step 306a. Thus, the target eNB knows a PDCP packet starting from which the data packet should be transmitted to an SGW, according to the received uplink count. Corresponding to this method, more preferably, after the step 304 and before the step 306 or 306a, the source eNB can directly transmit the sequentially received uplink data packets to the SGW, and forward other data packets to the target eNB.

Step 304: By the source eNB, a Sequence Number (SN) status transfer is transmitted to the target eNB.

In this step, the source eNB does not freeze the transmission and receive status.

The source eNB starts to forward data to the target eNB.

In order to solve the problem in the missing or duplicated transmission of downlink data in an enhanced handover process, there are the following several methods.

Method 1: An order of forwarded data packets is identified by an SN in a GTP-U header. The target eNB knows a sequential order of receiving PDCP data packets according to the SN in the GTP-U header, then identifies the first data packet without a PDCP SN according to the SN to be used by the next PDCP received from the source eNB, and successively identifies subsequent data packets. Thus, upon receiving the next PDCP SN to be transmitted from the UE, the target eNB can correctly transmit the next PDCP data packet that has not been received by the UE. Even if the X2 interface cannot realize sequential transmission, according to the SN in the GTP-U header, the target eNB still knows the correct order of the data packets transmitted by the source eNB, so that the correct PDCP data packet is marked with the next PDCP SN, thereby avoiding the missing or duplicated transmission of a data packet.

Method 2: Only the data is forwarded in this step, without transmitting the SN status transfer message to the target eNB. The source eNB contains an SN in all PDCP data packets forwarded to the target eNB, and the data packets carrying the SN are also to be transmitted to the UE. In the step 306a, the source eNB informs the target eNB of the PDCP uplink receive status and uplink and downlink counts of the source eNB. Thus, the target eNB knows a downlink transmission status on the source side when the source eNB stops transmitting the downlink data, and an uplink receive status when the source eNB stops receiving the uplink data packets and a transmission status of the uplink data transmitted by the source eNB to the SGW. Meanwhile, the problem in the uplink and downlink data transmission in the present invention is solved, and no missing and duplicated transmission of data is ensured.

Method 3: A Frame Protocol (FP) is defined in the data packets forwarded to the target eNB by the source eNB. A data portion of the FP contains the forwarded PDCP data packets, and a packet header of the FP contains a sequence number of the forwarded data packets. The target eNB knows a sequential order of receiving PDCP data packets according to the SN in the FP header, then identifies the first data packet without the PDCP SN according to the SN to be used by the next PDCP received from the source eNB, and successively identifies subsequent data packets. Thus, upon receiving the next PDCP SN to be transmitted from the UE, the target eNB can correctly transmit the next PDCP data packet that has not been received by the UE. Even if the X2 interface cannot realize sequential transmission, according to the SN in the FP header, the target eNB still knows the correct order of the data packets transmitted by the source eNB, so that the correct PDCP data packet is marked with the next PDCP SN, thereby avoiding the missing or duplicated transmission of a data packet.

Method 4: All data packets forwarded to the target eNB by the source eNB contain a PDCP SN. The next PDCP SN to be used, contained in the data packets transmitted to the target eNB by the source eNB, is dummy. Upon receiving the forwarded data packets, the target eNB ignores the received next PDCP SN to be used if it is found that all the forwarded data packets contain the SN. Or, the next PDCP SN to be used, contained in the data packets transmitted to the target eNB by the source eNB, is a particular value. Upon receiving the SN status transfer message, the target eNB ignores the received next PDCP SN to be used if it is found that the next PDCP SN to be used is a particular value.

Method 5: The source eNB estimates the number of PDCP data packets transmitted to the UE after receiving the SN status transfer message. Upon transmitting a corresponding number of data packets, the source eNB stops transmitting data to the UE. When forwarding a corresponding number of data packets to the target eNB, the source eNB contains a PDCP SN in the data packets, but does not contain a PDCP SN in the subsequent data packets. The target eNB uses the received next PDCP SN to be used to represent the received data packet without a PDCP SN.

Step 305: The UE is synchronized to the target eNB. The UE accesses to a target cell via a Random Access Channel (RACH). The UE stops receiving the downlink data from the source eNB, and stops transmitting the uplink data at the source eNB.

In order to solve the problem in the uplink data transmission in the present invention, a third method is as follows: according to the uplink receive status received in the message of the step 304 and in combination with the uplink data that is forwarded by the source eNB and received from the source eNB, the target eNB updates the uplink receive status and then transmits the updated uplink receive status to the UE. If the target eNB still continues receiving data forwarded from the source eNB after the RACH is successful, the target eNB forms a new uplink receive status upon receiving all forwarded data from the source eNB. The target eNB knows that the source eNB has finished data forwarding according to an end marker. Corresponding to the third method, steps 306 and 306a may not be executed.

Step 306: By the target eNB, a data transmission stopping indication is transmitted to the source eNB. The message for transmitting the data transmission stopping indication contains a new eNB UE X2AP (X2 Application Protocol) ID and an old eNB UE X2AP ID of the UE. Upon receiving this message, the source eNB stops transmitting the downlink data to the UE. The source eNB stops receiving the uplink data from the UE.

The data forwarded to the target eNB by the source eNB can contain PDCP data packets containing an SN, and PDCP data packets containing no SN. The source eNB informs the target eNB of the next PDCP SN to be used via step 306a.

Through this process, the source eNB can timely know that the UE stops receiving and transmitting the data at the source eNB, so that the source eNB does not need an idle air interface for data transmission or uplink receipt.

The method provided by the present invention is described by taking an X2 handover process as example. If the handover is an S1 handover, the target eNB transmits the data transmission stopping indication to the source eNB by a Mobility Management Entity (MME). The S1 message for transmitting the data transmission stopping indication contains an eNB eNB UE S1AP (S1 Application Protocol) ID and an MME UE S1AP ID.

Step 306*a*: By the source eNB, a second SN status transfer message is transmitted to the target eNB. This message contains a receive status of an uplink Packet Data Convergence Protocol Sequence Number (PDCP SN) and/or Hyper-Frame Number (HFN). The message contains a transmission status of a downlink PDCP SN and/or HFN. The message contains a receive status of an uplink PDCP SDU, an uplink count and a downlink count. The second SN status transfer message and the SN status transfer in the step 304 can be a same message or different messages. When the second SN status transfer message is transmitted, it is indicated that the source eNB has frozen the transmission and receive status.

In the method provided by the present invention, this step is optional and may or may not be executed.

Step 307: By the UE, an RRC connection reconfiguration completion message is transmitted to the target eNB. After the step 303, the source eNB simultaneously transmits data to the UE and forwards data to the target eNB. Therefore, a part of the forwarded data received from the source eNB by the target eNB may be already received by the UE. There are following three ways for the target eNB to detect data that is not to be transmitted to the UE.

Way 1: According to a transmission status of a PDCP SN and/or HFN received from the source eNB in the step 306*a*, the target eNB discards duplicated data and directly transmits data that has been not received by the UE. The duplicated data refers to data that is transmitted to the UE and forwarded to the target eNB simultaneously by the source eNB.

Way 2: According to a PDCP status report received from the UE, the target eNB detects duplicated data that is not to be transmitted to the UE, then discards the duplicated data and directly transmits data that has been not received by the UE. The target eNB transmits data packets to the UE, starting from a data packet having the next PDCP SN expected by the UE in the PDCP status report.

Way 3: In combination with the transmission status of the PDCP SN and/or HFN received in the step 306*a* and the PDCP status report received from the UE, the target eNB detects duplicated data that is not to be transmitted to the UE, then discards the duplicated data and directly transmits data that has been not received by the UE. In other words, in combination with the second SN status transfer message and the PDCP status report received from the UE, the target eNB detects duplicated data that is not to be transmitted to the UE, then discards the duplicated data and directly transmits data that has been not received by the UE, the second SN status transfer message containing the transmission status of the PDCP SN and/or HFN.

The target eNB knows the next data packet that is expected expected to be received according to the receive status of uplink PDCP data packets received in the step 306*a*, and the target eNB transmits this information to the UE. Thus, the UE transmits, to the target eNB, the data packet starting from the next data packet that has not been received from the network side. The target eNB knows the next data packet to be transmitted to the SGW according to the uplink count received from the source eNB in the step 306*a*, so that a data packet is avoided from being repeatedly transmitted to the SGW or being missed.

According to the uplink receive status received from the target eNB and in combination with the data transmitted by the UE at the source eNB and the feedback received from the source eNB, the UE transmits uplink data packets to the target eNB starting from the next data packet that has not been received by the source eNB.

Step 308: By the target eNB, a path handover request message is transmitted to an MME.

Step 309: By the MME, a path handover request response message is transmitted to the target eNB.

Step 310: By the target eNB, a UE context release message is transmitted to the source eNB.

Now, the first method for supporting seamless handover according to the present invention has been described. By this method, the unnecessary data transmission or unnecessary data monitoring of the source eNB can be avoided. Actually, the UE has stopped the downlink receipt and uplink transmission at the source eNB, so the air interface resources and power loss are saved. By this method, the continuous transmission of uplink and downlink data can be ensured, and the missing or duplication transmission of data can be avoided.

FIG. 4 shows a second method for supporting seamless handover according to the present invention. This method comprises the following steps.

Step 401: By a source eNB, a handover request message is transmitted to a target eNB.

Step 402: By the target eNB, a handover request acknowledge message is transmitted to the source eNB.

Step 403: By the source eNB, an RRC connection reconfiguration message is transmitted to a UE. The source eNB continues transmitting downlink data to the UE. The source eNB continues receiving uplink data from the UE. Upon receiving this message, the UE continues receiving the downlink data transmitted by the source eNB, and continues transmitting the uplink data to the source eNB.

In order to solve the problem in the uplink data transmission in the present invention, one corresponding method is that the source eNB continues feeding an uplink data receive status back to the UE after this step or after step 404. Thus, the UE knows which data packets have been already received from the UE by the source eNB. Accordingly, upon transmitting a message in step 407, the UE knows a data packet starting from which the data packet should be transmitted to the target eNB.

In order to solve the problem in the uplink data transmission in the present invention, a second method is that the source eNB transmits an uplink receive status after stopping receiving the uplink data to the target eNB via step 406*a* or step 408*a*. Thus, the target eNB can accurately know an uplink receive status of the source eNB after the UE stops transmitting the uplink data, so that the target eNB can inform the UE of this, and the UE then transmits data packets that have not been received by the source eNB to the target eNB. Corresponding to this method, more preferably, step 404 can be omitted and not executed. The source eNB transmits an uplink count after stopping receiving the uplink data to the target eNB via step 406*a* or step 408*a*. Thus, the target eNB knows a PDCP packet starting from which the data is transmitted to an SGW, according to the received uplink count. Corresponding to this method, more preferably, after the step 404 and before the step 406 or 406*a*, or the step 408 or 408*a*, the source eNB can directly transmit the sequentially received uplink data packets to the SGW, and forward other data packets to the target eNB.

Step 404: By the source eNB, a Sequence Number (SN) status transfer is transmitted to the target eNB.

In this step, the source eNB does not freeze the transmission and receive status.

The source eNB starts to forward data to the target eNB.

In order to solve the problem in the missing or duplication transmission of downlink data in an enhanced handover process, there are the following several methods.

Method 1: An order of forwarded data packets is identified by an SN in a GTP-U header. The target eNB knows a sequential order of receiving PDCP data packets according to the SN in the GTP-U header, then identifies the first data packet without a PDCP SN according to the SN to be used by the next PDCP received from the source eNB, and successively identifies subsequent data packets. Thus, upon receiving the next PDCP SN to be transmitted from the UE, the target eNB can correctly transmit the next PDCP data packet that has not been received by the UE. Even if the X2 interface cannot realize sequential transmission, according to the SN in the GTP-U header, the target eNB still knows the correct order of the data packets transmitted by the source eNB, so that the correct PDCP data packet is marked with the next PDCP SN, thereby avoiding the missing or duplication transmission of the data packets.

Method 2: Only the data is forwarded in this step, without transmitting the SN status transfer message to the target eNB. The source eNB contains an SN in all PDCP data packets forwarded to the target eNB, and the data packets carrying the SN are also to be transmitted to the UE. The source eNB informs the target eNB of the receive status of the uplink PDCP data packets and an uplink count in step 406a, and informs the target eNB of a downlink count via step 408a. Or, the source eNB informs the target eNB of the PDCP uplink receive status and uplink and downlink count of the source eNB via step 408a. Thus, the target eNB knows a downlink transmission status on the source side when the source eNB stops transmitting the downlink data, and an uplink receive status when the source eNB stops receiving the uplink data packets, and a transmission status of the uplink data transmitted by the source eNB to the SGW. Meanwhile, the problem in the uplink and downlink data transmission in the present invention is solved, and no missing and duplication transmission of data is ensured.

Method 3: A FP is defined in the data packets forwarded to the target eNB by the source eNB. A data portion of the FP contains the forwarded PDCP data packets, and a packet header of the FP contains a sequence number of the forwarded data packets. The target eNB knows a sequential order of receiving PDCP data packets according to the SN in the FP header, then identifies the first data packet without the PDCP SN according to the SN to be used by the next PDCP received from the source eNB, and successively identifies subsequent data packets. Thus, upon receiving the next PDCP SN to be transmitted from the UE, the target eNB can correctly transmit the next PDCP data packet that has not been received by the UE. Even if the X2 interface cannot realize sequential transmission, according to the SN in the FP header, the target eNB still knows the correct order of the data packets transmitted by the source eNB, so that the correct PDCP data packet is marked with the next PDCP SN, thereby avoiding the missing or duplication transmission of the data packets.

Method 4: All data packets forwarded to the target eNB by the source eNB contain a PDCP SN. The next PDCP SN to be used, contained in the data packets transmitted to the target eNB by the source eNB, is dummy. Upon receiving the forwarded data packets, the target eNB ignores the received next PDCP SN to be used if it is found that all the forwarded data packets contain the SN. Or, the next PDCP SN to be used contained in the data packets transmitted to the target eNB by the source eNB is a particular value. Upon receiving the SN status transfer message, the target eNB ignores the received next PDCP SN to be used if it is found that the next PDCP SN to be used is a particular value.

Method 5: The source eNB estimates the number of PDCP data packets transmitted to the UE after receiving the SN status transfer message. Upon transmitting a corresponding number of data packets, the source eNB stops transmitting data to the UE. When forwarding a corresponding number of data packets to the target eNB, the source eNB contains a PDCP SN in the data packets, but does not contain a PDCP SN in the subsequent data packets. The target eNB uses the received next PDCP SN to be used to represent the received data packet without a PDCP SN.

Step 405: The UE is synchronized to the target eNB. The UE accesses to a target cell via a Random Access Channel (RACH). The UE stops transmitting uplink data at the source eNB.

In order to solve the problem in the uplink data transmission in the present invention, a third method is as follows: according to the uplink receive status received in the message of the step 404 and in combination with the uplink data that is forwarded by the source eNB and received from the source eNB, the target eNB updates the uplink receive status and then transmits the updated uplink receive status to the UE. If the target eNB still continues receiving data forwarded from the source eNB after the RACH is successful, the target eNB forms a new uplink receive status upon receiving all forwarded data from the source eNB. The target eNB knows that the source eNB has finished data forwarding according to an end marker. Corresponding to the third method, steps 406 and 406a may not be executed. Corresponding to the third method, steps 408 and 408a may also not be executed.

Step 406: By the target eNB, an uplink data receipt stopping indication is transmitted to the source eNB. The message for transmitting the uplink data receipt stopping indication contains a new eNB UE X2AP ID and an old eNB UE X2AP ID of the UE. Upon receiving the message, the source eNB stops receiving the uplink data from the UE.

The method provided by the present invention is described by taking an X2 handover process as example. If the handover is an S1 handover, the target eNB transmits the uplink data receipt stopping indication to the source eNB by a Mobility Management Entity (MME). The S1 message for transmitting the uplink data receipt stopping indication contains an eNB eNB UE S1AP ID and an MME UE S1AP ID.

In the method provided by the present invention, this step is an optional and may or may not be executed. When this step is not executed, step 406a is also not to be executed. When this step is not executed, upon receiving the message of step 408, the source eNB stops receiving the uplink data from the UE. Through this process, the source eNB can timely know that the UE stops transmitting the data to the source eNB, so that the source eNB does not need an idle air interface for data monitoring.

Step 406a: By the source eNB, a third SN status transfer message is transmitted to the target eNB. The message contains a receive status of an uplink PDCP SN and/or HFN, and this message also contains a receive status of an uplink PDCP data packets and an uplink count. The third SN status transfer message and the SN status transfer in the step 404 can be a same message or different messages. When the third SN status transfer message is transmitted, it is indicated that the source eNB has frozen the receive status. In the method provided by the present invention, this step is an optional and may or may not be executed.

Step 407: By the UE, an RRC connection reconfiguration completion message is transmitted to the target eNB. After the step 403, the source eNB simultaneously transmits data to the UE and forwards data to the target eNB. Therefore, a part of the forwarded data received from the source eNB by the target eNB may be already received by the UE. According to a PDCP status report received from the UE, the target eNB detects duplicated data that is not to be transmitted to the UE, then discards the duplicated data and directly transmits data that has been not received by the UE. The target eNB transmits data packets to the UE, starting from a data packet having the next PDCP SN expected by the UE in the PDCP status report. The UE stops receiving the downlink data from the source eNB.

The target eNB knows the next data packet that is expected to be received according to the receive status of uplink PDCP data packets received in the step 406a, and the target eNB transmits this information to the UE. Thus, the UE, transmits, to the target eNB, the data packet staring from the next data packet that has not been received from the network side. The target eNB knows the next data packet to be transmitted to the SGW according to the uplink count received from the source eNB in the step 406a, so that a data packet is from being repeatedly transmitted to the SGW or being missed.

According to the uplink receive status received from the target eNB and in combination with the data transmitted by the UE at the source eNB and the feedback received from the source eNB, the UE transmits uplink data packets to the target eNB starting from the next data packet that has not been received by the source eNB.

Step 408: By the target eNB, a data transmission stopping indication is transmitted to the source eNB. The message for transmitting the data transmission stopping indication contains a new eNB UE X2AP ID and an old eNB UE X2AP ID of the UE. Upon receiving this message, the source eNB stops transmitting the downlink data to the UE. If the step 406 is not executed, the source eNB also stops receiving the uplink data from the UE.

The data forwarded to the target eNB by the source eNB can contain PDCP data packets containing an SN, and PDCP data packets containing no SN. The source eNB informs the target eNB of the next PDCP SN to be used via step 408a.

Through this process, the source eNB can timely know that the UE stops receiving the data from the source eNB, so that the source eNB does not need an idle air interface for downlink data transmission.

There are following three ways for the target eNB to detect data that is not to be transmitted to the UE.

Way 1: According to a transmission status of a PDCP SN and/or HFN received from the source eNB in the step 408a, the target eNB discards duplicated data and directly transmits data that has been not received by the UE. The duplicated data refers to data that is transmitted to the UE and forwarded to the target eNB simultaneously by the source eNB.

Way 2: According to a PDCP status report received from the UE, the target eNB detects duplicated data that is not to be transmitted to the UE, then discards the duplicated data and directly transmits data that has been not received by the UE. The target eNB transmits data packets to the UE, starting from a data packet having the next PDCP SN expected by the UE in the PDCP status report.

Way 3: In combination with the transmission status of PDCP SN and/or HFN received in the step 408a and the PDCP status report received from the UE, the target eNB detects duplicated data that is not to be transmitted to the UE, then discards the duplicated data and directly transmits data that has been not received by the UE. In other words, in combination with the second SN status transfer message and the PDCP status report received from the UE, the target eNB detects duplicated data that is not to be transmitted to the UE, then discards the duplicated data and directly transmits data that has been not received by the UE, the second SN status transfer message containing the transmission status of the PDCP SN and/or HFN, where the second SN status transfer message contains the transmission status of the PDCP SN and/or HFN.

The target eNB knows the next data packet that is expected to be received according to the receive status of uplink PDCP data packets received in the step 406a, and the target eNB transmits this information to the UE. Thus, at the target eNB, the UE transmits starting from the next data packet that has not been received from the network side. The target eNB knows the next data packet to be transmitted to the SGW according to the uplink count received from the source eNB in the step 406a, so that a data packet is from being repeatedly transmitted to the SGW or being missed.

The method provided by the present invention is described by taking an X2 handover process as example. If the handover is an S1 handover, the target eNB transmits the data transmission stopping indication to the source eNB via a Mobility Management Entity (MME). The S1 message for transmitting the data transmission stopping indication contains an eNB eNB UE S1AP ID and an MME UE S1AP ID.

Step 408a: By the source eNB, a fourth SN status transfer message is transmitted to the target eNB. The message contains a transmission status of a downlink PDCP SN and/or HFN, and the message also contains a downlink count. The fourth SN status transfer message and the SN status transfer in the step 404 can be a same message or different messages. When the fourth SN status transfer message is transmitted, it is indicated that the source eNB has frozen the transmission status. If the steps 406 and 406a are not executed, the message further contains a receive status of the uplink PDCP SDU and an uplink count. When the fourth status transfer message is transmitted, it is also indicated that the source eNB has frozen the receive status.

In the method provided by the present invention, this step is an optional and may or may not be executed.

Step 409: By the target eNB, a path handover request message is transmitted to an MME.

Step 410: By the MME, a path handover request response message is transmitted to the target eNB.

Step 411: By the target eNB, a UE context release message is transmitted to the source eNB.

Now, the second method for supporting seamless handover provided by the present invention has been described. By this method, the unnecessary data transmission to the UE from the source eNB and unnecessary uplink data channel monitoring of the source eNB can be avoided. Actually, the UE has stopped the downlink receipt and uplink transmission at the source eNB, so the air interface resources and power loss are saved. By this method, the continuous transmission of uplink and downlink data can be ensured, and the missing or duplication transmission of data can be avoided.

FIG. 5 shows a third method for supporting seamless handover according to the present invention. This method comprises the following steps.

Step 501: By a source eNB, a handover request message is transmitted to a target eNB.

Step 502: By the target eNB, a handover request acknowledge message is transmitted to the source eNB.

Step 503: By the source eNB, an RRC connection reconfiguration message is transmitted to a UE. The source eNB continues transmitting downlink data to the UE. The source eNB continues receiving uplink data from the UE. Upon receiving this message, the UE continues receiving the downlink data transmitted by the source eNB, and continues transmitting the uplink data to the source eNB.

In order to solve the problem in the uplink data transmission in the present invention, one corresponding method is that the source eNB continues feeding an uplink data receive status back to the UE after this step or after step 504. Thus, the UE knows which data packets have been already received from the UE by the source eNB. Accordingly, upon transmitting a message in step 507, the UE knows a data packet starting from which the data packet should be transmitted to the target eNB.

In order to solve the problem in the uplink data transmission in the present invention, a second method is that the source eNB transmits an uplink receive status after stopping receiving the uplink data to the target eNB through step 508a. Thus, the target eNB can accurately know an uplink receive status of the source eNB after the UE stops transmitting the uplink data, so that the target eNB can inform the UE of this, and the UE then transmits data packets that have not been received by the source eNB to the target eNB. Corresponding to this method, more preferably, step 504 may be omitted and not executed. The source eNB transmits an uplink count after stopping receiving the uplink data to the target eNB via step 508a. Thus, the target eNB knows a PDCP packet from starting which the data is transmitted to an SGW, according to the received uplink count. Correspondingly to this method, more preferably, after the step 504 and before the step 508 or 508a, the source eNB can directly transmit the sequentially received uplink data packets to the SGW, and forward other data packets to the target eNB.

Step 504: By the source eNB, a Sequence Number (SN) status transfer is transmitted to the target eNB.

In this step, the source eNB does not freeze the transmission and receive status.

Step 505: The source eNB starts to forward data to the target eNB.

In order to solve the problem in the missing or duplication transmission of downlink data in an enhanced handover process, there are the following several methods.

Method 1: An order of forwarded data packets is identified by an SN in a GTP-U header. The target eNB knows a sequential order of receiving PDCP data packets according to the SN in the GTP-U header, then identifies the first data packet without a PDCP SN according to the SN to be used by the next PDCP received from the source eNB, and successively identifies subsequent data packets. Thus, upon receiving the next PDCP SN to be transmitted from the UE, the target eNB can correctly transmit the next PDCP data packet that has not been received by the UE. Even if the X2 interface cannot realize sequential transmission, according to the SN in the GTP-U header, the target eNB still knows the correct order of the data packets transmitted by the source eNB, so that the correct PDCP data packet is marked with the next PDCP SN, thereby avoiding the missing or duplication transmission of the data packets.

Method 2: The process of transmitting an SN status transfer message to the target eNB by the source eNB in the step 504 is not executed. The source eNB contains an SN in all PDCP data packets forwarded to the target eNB, and the data packets carrying the SN are also to be transmitted to the UE. In step 508a, the source eNB informs the target eNB of the PDCP uplink receive status and uplink and downlink count of the source eNB. Thus, the target eNB knows a downlink transmission status on the source side when the source eNB stops transmitting the downlink data, and an uplink receive status when the source eNB stops receiving the uplink data packets, and a transmission status of the uplink data transmitted by the source eNB to the SGW. Meanwhile, the problem in the uplink and downlink data transmission in the present invention is solved, and no missing and duplication transmission of data is ensured.

Method 3: A FP is defined in the data packets forwarded to the target eNB by the source eNB. A data portion of the FP contains the forwarded PDCP data packets, and a packet header of the FP contains a sequence number of the forwarded data packets. The target eNB knows a sequential order of receiving PDCP data packets according to the SN in the FP header, then identifies the first data packet without the PDCP SN according to the SN to be used by the next PDCP received from the source eNB, and successively identifies subsequent data packets. Thus, upon receiving the next PDCP SN to be transmitted from the UE, the target eNB can correctly transmit the next PDCP data packet that has not been received by the UE. Even if the X2 interface cannot realize sequential transmission, according to the SN in the FP header, the target eNB still knows the correct order of the data packets transmitted by the source eNB, so that the correct PDCP data packet is marked with the next PDCP SN, thereby avoiding the missing or duplication transmission of the data packets.

Method 4: All data packets forwarded to the target eNB by the source eNB contain a PDCP SN. The next PDCP SN to be used, contained in the data packets transmitted to the target eNB by the source eNB, is dummy. Upon receiving the forwarded data packets, the target eNB ignores the received next PDCP SN to be used if it is found that all the forwarded data packets contain the SN. Or, the next PDCP SN to be used contained in the data packets transmitted to the target eNB by the source eNB is a particular value. Upon receiving the SN status transfer message, the target eNB ignores the received next PDCP SN to be used if it is found that the next PDCP SN to be used is a particular value.

Method 5: The source eNB estimates the number of PDCP data packets transmitted to the UE after receiving the SN status transfer message. Upon transmitting a corresponding number of data packets, the source eNB stops transmitting data to the UE. When forwarding a corresponding number of data packets to the target eNB, the source eNB contains a PDCP SN in the data packets, but does not contain a PDCP SN in the subsequent data packets. The target eNB uses the received next PDCP SN to be used to represent the received data packet without a PDCP SN.

Step 506: The UE is synchronized to the target eNB. The UE accesses to a target cell via a Random Access Channel (RACH).

In order to solve the problem in the uplink data transmission in the present invention, a third method is as follows: according to the uplink receive status received in the message of the step 504 and in combination with the uplink data that is forwarded by the source eNB and received from the source eNB, the target eNB updates the uplink receive status and then transmits the updated uplink receive status to the UE. If the target eNB still continues receiving data forwarded from the source eNB after the RACH is successful, the target eNB forms a new uplink receive status upon receiving all forwarded data from the source eNB. The target eNB knows that the source eNB has finished data forwarding according to an end marker. Corresponding to the third method, steps 508 and 508a may not be executed.

Step 507: By the UE, an RRC connection reconfiguration completion message is transmitted to the target eNB. After the step 403, the source eNB simultaneously transmits data to the UE and forwards data to the target eNB. Therefore, a part of the forwarded data received from the source eNB by the target eNB may be already received by the UE. According to a PDCP status report received from the UE, the target eNB detects duplicated data that is not to be transmitted to the UE, then discards the duplicated data and directly transmits data that has been not received by the UE. The target eNB transmits data packets to the UE, starting from a data packet having the next PDCP SN expected by the UE in the PDCP status report. The UE stops receiving the downlink data from the source eNB, and stops transmitting the uplink data to the source eNB.

According to the uplink receive status received from the target eNB and in combination with the data transmitted by the UE at the source eNB and the feedback received from the source eNB, the UE transmits uplink data packets to the target eNB starting from the next data packet that has not been received by the source eNB.

Step 508: By the target eNB, a data transmission stopping indication is transmitted to the source eNB. The message for transmitting the data transmission stopping indication contains a new eNB UE X2AP ID and an old eNB UE X2AP ID of the UE. Upon receiving this message, the source eNB stops transmitting the downlink data to the UE. The source eNB stops receiving the uplink data from the UE.

The method provided by the present invention is described by taking an X2 handover process as example. If the handover is an S1 handover, the target eNB transmits the data transmission stopping indication to the source eNB by a Mobility Management Entity (MME). The S1 message for transmitting the data transmission stopping indication contains an eNB eNB UE S1AP ID and an MME UE S1AP ID.

The data forwarded to the target eNB by the source eNB can contain PDCP data packets containing an SN, and PDCP data packets containing no SN. The source eNB informs the target eNB of the next PDCP SN to be used via step 508a.

Through this process, the source eNB can timely know that the UE stops receiving and transmitting the data at the source eNB, so that the source eNB does not need an idle air interface for data transmission or uplink receipt.

Step 508a: By the source eNB, a fifth SN status transfer message is transmitted to the target eNB. The message contains a receive status of an uplink PDCP SN and/or HFN. The message contains a transmission status of a downlink PDCP SN and/or HFN. The message contains a receive status of an uplink PDCP SDU, an uplink count and a downlink count. The fifth SN status transfer message and the SN status transfer in the step 504 can be a same message or different messages. When the second status transfer message is transmitted, it is indicated that the source eNB has frozen the transmission and receive status.

The target eNB knows the next data packet that is expected to be received according to the receive status of uplink PDCP data packets received in the step 508a, and the target eNB transmits this information to the UE. Thus, the UE transmits, to the target eNB, the data packet starting from the next data packet that has not been received from the network side. The target eNB knows the next data packet to be transmitted to the SGW according to the uplink count received from the source eNB in the step 508a, so that a data packet is from being repeatedly transmitted to the SGW or being missed.

Step 509: By the target eNB, a path handover request message is transmitted to an MME.

Step 510: By the MME, a path handover request response message is transmitted to the target eNB.

Step 511: By the target eNB, a UE context release message is transmitted to the source eNB.

Now, the third method for supporting seamless handover according to the present invention has been described. By this method, the unnecessary data transmission to the UE by the source eNB and the unnecessary monitoring of the uplink data channel can be avoided. However, actually, the UE has stopped the downlink receipt and uplink transmission at the source eNB, so the air interface resources and power loss are saved.

FIG. 6 is a schematic diagram of an embodiment for dual connectivity of the first method for supporting seamless handover according to the present invention. This method comprises the following steps.

Step 601: By a Master eNB (MeNB), a Secondary eNB (SeNB) addition request message is transmitted to a Target SeNB (T-SeNB).

Step 602: By the T-SeNB, an SeNB addition request acknowledge message is transmitted to the MeNB.

Step 603: If resources for the T-SeNB are allocated successfully, by the MeNB, an SeNB release request message is transmitted to a Source SeNB (S-SeNB). If the data is to be forwarded, the MeNB provides the S-SeNB with a data forwarding address. Upon receiving the SeNB release message, the S-SeNB continues transmitting the data to a UE. The S-SeNB can start to forward the data.

Corresponding to a split bearer, the S-SeNB continues transmitting uplink data to the MeNB. Corresponding to a Second Cell Group (SCG) bearer, the S-SeNB continues transmitting uplink data to an SGW.

For the SCG bearer, the S-SeNB continues feeding an uplink data receive status to the UE after this step. Thus, the UE knows which data packets have been already received from the UE by the S-SeNB. Accordingly, upon transmitting the message in the step 608, the UE knows a data packet starting from which the data packet should be transmitted to the target eNB.

In another method provided by the present invention, this step can be omitted and not be executed, so that the S-SeNB will continue transmitting data to the UE.

Step 604: By the S-SeNB, the data is forwarded to the T-SeNB. Corresponding to the split bearer, the S-SeNB forwards the data to the MeNB, and then the MeNB forwards the data to the T-SeNB. For the SCG bearer, like the split bearer, the S-SeNB can forward the data to the T-SeNB via the MeNB, or the S-SeNB can directly forward the data to the T-SeNB. Depending on the implementation, the forwarding the data to the T-SeNB by the S-SeNB can be executed at any time after the step 603.

Step 605: By the MeNB, an RRC connection reconfiguration message is transmitted to a UE. The MeNB continues transmitting downlink data to the S-SeNB. Meanwhile, the MeNB also forwards the downlink data to the T-SeNB.

Step 606: The RRC connection reconfiguration message is received by the UE. The UE does not delete or reset the configuration for the S-SeNB. The UE continues receiving the downlink data transmitted by the S-SeNB. The UE continues transmitting the uplink data to the S-SeNB. The UE transmits an RRC connection reconfiguration completion message to the MeNB.

Step 607: By the MeNB, an SeNB reconfiguration completion message is transmitted to the T-SeNB.

Step 608: The UE is synchronized to the T-SeNB.

The UE stops receiving the downlink data from the S-SeNB, and also stops transmitting the uplink data at the S-SeNB.

Step 609: By the T-SeNB, a data transmission stopping indication is transmitted to the MeNB. The message for transmitting the data transmission stopping indication contains an eNB UE X2AP ID allocated for the UE by the T-SeNB and an eNB UE X2AP ID allocated for the MeNB by the T-SeNB. Upon receiving this message, the MeNB stops transmitting the downlink data to the S-SeNB.

Step 610: By the MeNB, the data transmission stopping indication is transmitted to the S-SeNB. The message for transmitting the data transmission stopping indication contains an eNB UE X2AP ID allocated for the UE by the MeNB and an eNB UE X2AP ID allocated for the S-SeNB by the MeNB. Upon receiving this message, the S-SeNB stops transmitting the downlink data to the UE. The S-SeNB stops receiving the uplink data from the UE.

Through the processes in the steps 609 and 610, the S-SeNB can timely know that the UE stops receiving and transmitting the data at the S-SeNB, so that the S-SeNB does not need an idle air interface for data transmission or uplink receipt.

Step 611a: By the S-SeNB, an SN status transfer is transmitted to the MeNB.

Step 611b: By the MeNB, the SN status transfer is transmitted to the T-SeNB.

For the SCG bearer, the execution of the steps 611a and 611b after the step 610 has the following advantages: the T-SeNB can accurately know the receive status of the S-SeNB after the UE stops transmitting the uplink data, so that the T-SeNB can inform the UE of this and the UE then can transmit data packets that have not been received by the S-SeNB to the T-SeNB. Corresponding to this method, more preferably, after the step 603 and before the step 610, the S-SeNB can directly transmit the sequentially received uplink data packets to the SGW, and forward other data packets to the T-SeNB.

For the SCG bearer, the T-SeNB knows the next data packet that is expected to be received according to the receive status of uplink PDCP data packets received in the message of the step 611b, and the T-SeNB transmits this information to the UE. Thus, the UE transmits, to the T-SeNB, the data packet starting from the next data packet that has not been received from the network side. The T-SeNB knows the next data packet to be transmitted to the SGW according to the uplink count received from the S-SeNB in the step 611b, so that a data packet is from being repeatedly transmitted to the SGW or being missed.

For the split bearer, the steps 611a and 611b can be executed at any time after the step 603.

For the SCG bearer, the steps 611a and 611b can be executed after the step 610.

The detailed descriptions of steps irrelevant to the main contents of the present application are omitted here, for example, the ERAB modification indication process between the MeNB and the MME.

Now, the embodiment for dual connectivity of the first method for supporting seamless handover provided by the present application has been described. By this method, the unnecessary data transmission to the UE by the S-SeNB or the unnecessary data monitoring of an uplink data channel can be avoided. However, actually, the UE has stopped the downlink receipt and uplink transmission at the S-SeNB, so the air interface resources and power loss are saved. By this method, the continuous transmission of uplink and downlink data can be ensured, and the missing or duplication transmission of data can be avoided.

FIG. 7 shows a fourth method for supporting seamless handover according to the present invention. This method comprises the following steps.

Step 701: By a source eNB, a handover request message is transmitted to a target eNB.

In this embodiment, the source eNB decides to adopt an enhanced handover process. The enhanced handover refers a handover scheme for maintaining a connection to the source eNB, as discussed in the 3GPP Rel-14. Specifically, the enhanced handover process means that the source eNB still transmits downlink data to a UE and also receives uplink data from the UE during the handover execution process. More specifically, after the source eNB has transmitted an RRC connection reconfiguration message, or after the source eNB has transmitted an RRC connection reconfiguration message and before the target eNB receives an RACH access from the UE, or after the source eNB has transmitted an RRC connection reconfiguration message and before the target eNB receives the RRC connection reconfiguration from the UE, the source eNB still transmits downlink data to the UE and also receives uplink data from the UE. The meaning of the handover execution process is the same as the definition in the 3GPP TS36.300. The source eNB decides to adopt the enhanced handover process according to its support for the enhanced handover process and the capability of the UE. Or, the source eNB decides to adopt the enhanced handover process according to its support for the enhanced handover process, the capability of the UE, and the capability for supporting the enhanced handover process of the target eNB. The source eNB can also decide to adopt the enhanced handover process by taking the requirements of a service (e.g., Quality of Service (QoS) information) into consideration. The source eNB can also decide to adopt the enhanced handover process by taking other information into consideration, without influencing the main contents of the present invention. The source eNB acquires, from the UE, the capability for supporting the enhanced handover of the UE. The capability for supporting the enhanced handover of the UE means that, upon receiving the RRC connection reconfiguration message, the UE may not freeze the transmission and receive status at the source eNB and not reset or empty the information at the layer 2 (L2) of the source eNB, and may continue receiving or transmitting data from the source eNB. The source eNB knows the capability for supporting the enhanced handover process of the target eNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message or the X2 establishment response message maintains the received capability for supporting the enhanced handover process of the opposite eNB.

In the present invention, there are following methods to indicate to the target eNB that the source eNB adopts the enhanced handover process.

Method 1: By containing enhanced handover indication information in the handover request message, the source eNB indicates to the target eNB that this handover process is an enhanced handover process.

Method 2: The capability for supporting the enhanced handover of the UE is contained in the handover request message, and the target eNB knows that this handover process is an enhanced handover process according to the capability for supporting the enhanced handover process of the source eNB and the capability for supporting the enhanced handover of the UE. The source eNB acquires, from the UE, the capability for supporting the enhanced handover of the UE. The target eNB knows the capability for supporting the enhanced handover process of the source eNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message or the X2 establishment response message maintains the received capability for supporting the enhanced handover process of the opposite eNB. Corresponding to this method, if it is assumed that the source eNB supports the enhanced handover process, the source eNB will initiate an enhanced handover process when initiating a handover to a UE supporting the enhanced handover. Or, if it is assumed that both the source eNB and the target eNB support the enhanced handover process, the source eNB will initiate an enhanced handover process when initiating a handover to a UE supporting the enhanced handover.

The source eNB can inform the target eNB of the maximum number of data packets transmitted to the UE starting from the first data packet forwarded to the target eNB during the enhanced handover process, for example, the number of data packets within the maximum PDCP SN range minus 1, the number of data packets within the maximum PDCP SN range, or more. For example, if the PDCP SN is from 0 to 127, the data packets within the maximum PDCP SN range minus 1 are 127 PDCP SDUs or PDUs.

Step 702: By the target eNB, a handover request acknowledge message is transmitted to the source eNB.

If the target eNB receives the enhanced handover indication information from the source eNB, the target eNB contains the enhanced handover indication information in an RRC container of the handover request acknowledge message. The enhanced handover indication information is transmitted to the UE via the RRC container.

Step 703: By the source eNB, an RRC connection reconfiguration message is transmitted to a UE. This message contains the enhanced handover indication information. Corresponding to the enhanced handover process, the source eNB continues transmitting downlink data to the UE. Corresponding to a method provided by the present invention, the data packets continuously transmitted to the UE by the source eNB are at most the number of data packets within the maximum PDCP SN range minus 1 starting from the first data packet forwarded to the target eNB. For example, if the first data packet forwarded to the target eNB by the source eNB has a PDCP SN of 5 and an HFN of 10, the data packets transmitted to the UE by the source eNB at most have a PDCP SN of 3 and an HFN of 11.

The source eNB continues receiving uplink data from the UE. Upon receiving this message, the UE continues receiving the downlink data transmitted by the source eNB, and continues transmitting the uplink data at the source eNB. According to the enhanced handover indication information contained in the received RRC connection reconfiguration message, the UE knows that this handover process is an enhanced handover process, so that the UE continues transmitting and receiving data at the source eNB.

In order to solve the problem in the uplink data transmission in the present invention, one corresponding method is that the source eNB continues feedback an uplink data receive status back to the UE after this step or after step 704. Thus, the UE knows which data packets have been already received from the UE by the source eNB. Accordingly, upon transmitting a message in step 706, the UE knows a data packet staring from which the data packet should be transmitted to the target eNB.

Step 704: By the source eNB, a Sequence Number (SN) status transfer is transmitted to the target eNB.

In this step, the source eNB does not freeze the transmission and receive status.

The source eNB starts to forward data to the target eNB. The source eNB also forwards, to the target eNB, the downlink data that is transmitted to the UE. The source eNB forwards, to the target eNB, the uplink data packets received from the UE. One method is as follows: the source eNB forwards, to the target eNB, all the received uplink packets including the data packets received in-sequence or out-of-sequence after the SN status transfer message. Another method is as follows: the source eNB transmit the received data packets in sequence to an SGW, and forwards the received data packets out of sequence to the target eNB.

Step 705: The UE is synchronized to the target eNB. The UE accesses to a target cell via a Random Access Channel (RACH).

In the present invention, the UE can stop receiving the downlink data from the source eNB and stop transmitting the uplink data at the source eNB in this step. Or, the UE can stop receiving the downlink data from the source eNB and stop transmitting the uplink data at the source eNB in step 706.

In order to solve the problem in the uplink data transmission in the present invention, according to the uplink receive status and the uplink count received in the message of the step 704 and in combination with the uplink data that is forwarded by the source eNB and received from the source eNB, the target eNB updates the uplink receive status and then transmits the updated uplink receive status to the UE. If the target eNB still continues receiving the data forwarded from the source eNB after the RACH is successful, the target eNB forms a new uplink receive status upon receiving all forwarded data from the source eNB. The target eNB knows that the source eNB has finished data forwarding according to an end marker.

Step 706: By the UE, an RRC connection reconfiguration completion message is transmitted to the target eNB. After the step 703, the source eNB simultaneously transmits the downlink data to the UE and forwards the downlink data to the target eNB. Therefore, a part of the forwarded data received from the source eNB by the target eNB may be already received by the UE. There are following ways for the target eNB to detect data that don't need to be transmitted to the UE.

According to the PDCP status report received from the UE, the target eNB knows the next PDCP SN expected to be received by the UE. The target eNB detects duplicated data packets that don't need to be transmitted to the UE, and discards the data that has been received by the UE, and transmits data packet to the UE directly starting from the next data packet expected by the UE.

The PDCP status report transmitted to the target eNB by the UE merely contains the PDCP SN of the next data packet expected to be received, but does not contain an HFN corresponding to the PDCP SN.

By using the method described in the step 701, the target eNB can know whether this handover process is an enhanced handover process. For the enhanced handover process, the target eNB transmits data to the UE and/or transmits uplink data to the SGW by the method for the enhanced handover process. The target eNB determines an HFN corresponding to the PDCP SN of the next data packet expected to be received by the UE, according to the enhanced handover process.

The target eNB considers that the data packet corresponding to the next expected PDCP SN contained in the PDCP status received from the UE is a first data packet corresponding to this PDCP SN stored in a buffer of the target eNB. The maximum number of data packets transmitted to the UE by the source eNB starting from the first data packet forwarded to the target eNB is the number of data packets within the maximum PDCP SN range minus 1. For example, if the first data packet received from the source eNB by the target eNB has a PDCP SN of 5 and an HFN of 10, the data packets transmitted to the UE by the source eNB at most have a PDCP SN of 3 and an HFN of 11. Therefore, the maximum data packet received from the source eNB by the UE has a PDCP SN of 3 and an HFN of 11. If the data transmitted by the source eNB all has been received by the UE, the UE expects that the next received data packet has a PDCP SN of 4 and an HFN of 11. Therefore, this data packet is a first corresponding data packet having a PDCP SN of 4 in the buffer of the target eNB, and the HFN corresponding to this data packet is 11. If some data packets transmitted by the source eNB have not been received by the UE, for example, if the next expected PDCP SN in the PDCP status received from the UE by the target eNB is 9, this data packet is a first corresponding data packet having a PDCP SN of 9 in the buffer of the target eNB, and the target eNB knows that the corresponding HFN is 10. Therefore, if there are data packets having a same PDCP SN in the buffer of the target eNB, a first data packet not receiving a data packet SN in the first corresponding UE PDCP status report is the next data packet to be transmitted to the UE. In this way, the target eNB knows an HFN corresponding to this data packet.

Or, the target eNB considers that the next expected PDCP SN contained in the PDCP status received from the UE is not far from a half of the PDCP SN range of the PDCP SN in the DL count received in the SN status transfer message. In other words, if the maximum value of the PDCP SN is N, the next expected PDCP SN is not far from N/2 of the PDCP SN in the DL count. The source eNB also follows this principle, when transmitting data to the UE after transmitting the SN status transfer message. For example:

in the DL count, the HFN is 10, and the PDCP SN is 8;
the PDCP SN is 7 bits (the range of the SN is from 0 to 127);
when the next expected PDCP SN received from the UE by the target eNB is 73 to 127, the HFN is 9; and
when the next expected PDCP SN received from the UE by the target eNB is 0 to 72, the HFN is 10.

Upon transmitting the SN status transfer message, the source eNB continues transmitting the data to the UE, and then stops transmitting downlink data packets to the UE after the PDCP SN is 72 and the HFN is 10.

Corresponding to the enhanced handover process, if the next expected PDCP SN in the PDCP status received from the UE by the target eNB is 9, the target eNB knows that the corresponding HFN is 10. If the handover is not an enhanced handover, the target eNB knows that the corresponding HFN is 9.

In order to solve the problem in the uplink data transmission in the present invention, according to the uplink receive status and the uplink count received in the message of the step 704 and in combination with the uplink data that is forwarded by the source eNB and received from the source eNB, the target eNB updates the uplink receive status and then transmits the updated uplink receive status to the UE. The target eNB needs to form a new uplink receive status after all the forwarded data has been received from the source eNB. The target eNB knows that the source eNB has finished data forwarding according to an end marker. The target eNB transmits the generated uplink receive status to the UE.

According to the uplink receive status received from the target eNB and in combination with the data transmitted by the UE at the source eNB and the feedback received from the source eNB, the UE transmits uplink data to the target eNB starting from the next data packet that has not been received by the source eNB.

Step 707: By the target eNB, a path handover request message is transmitted to an MME.

Step 708: By the MME, a path handover request response message is transmitted to the target eNB.

Step 709: By the target eNB, a UE context release message is transmitted to the source eNB.

Now, the fourth method for supporting seamless handover provided by the present invention has been described. By this method, the interruption time of data transmission during the handover process can be reduced, the continuous transmission of uplink and downlink data can be ensured, and the missing or duplication transmission of data can be avoided. Particularly, the problem that the target eNB does not know the HFN corresponding to the next PDCP SN expected by the UE is solved. Thus, even if the source eNB and the target eNB are from different manufacturers, the interoperability between the two eNBs is ensured, and the interruption time of data transmission during the handover process is reduced while ensuring the operability during the enhanced handover process.

FIG. 8 shows a fifth method for supporting seamless handover according to the present invention. This method comprises the following steps.

Step 801: By a source eNB, a handover request message is transmitted to a target eNB.

Step 802: By the target eNB, a handover request acknowledge message is transmitted to the source eNB.

Step 803: By the source eNB, an RRC connection reconfiguration message is transmitted to a UE. Corresponding to the enhanced handover process, the source eNB continues transmitting downlink data to the UE. The source eNB continues receiving uplink data from the UE. Upon receiving this message, the UE continues receiving the downlink data transmitted by the source eNB, and continues transmitting the uplink data at the source eNB.

In order to solve the problem in the uplink data transmission in the present invention, one corresponding method is that the source eNB continues feeding an uplink data receive status back to the UE after this step or after step 804. Thus, the UE knows which data packets have been already received from the UE by the source eNB. Accordingly, upon transmitting a message in step 806, the UE knows a data packet staring from which the data packet should be transmitted to the target eNB.

Step 804: By the source eNB, a Sequence Number (SN) status transfer is transmitted to the target eNB.

In this step, the source eNB does not freeze the transmission and receive status.

The source eNB starts to forward data to the target eNB. The source eNB also forwards, to the target eNB, the downlink data that is transmitted to the UE. The source eNB forwards, to the target eNB, the uplink data packets received from the UE. One method is as follows: the source eNB forwards, to the target eNB, all the received uplink packets including the data packets received in-sequence or out-of-sequence after the SN status transfer message. Another method is as follows: the source eNB transmit the received data packets in sequence to an SGW, and forwards the received data packets out of sequence to the target eNB.

Step 805: The UE is synchronized to the target eNB. The UE accesses to a target cell via a Random Access Channel (RACH).

In the present invention, the UE can stop receiving the downlink data from the source eNB and stop transmitting the uplink data at the source eNB in this step. Or, the UE can stop receiving the downlink data from the source eNB and stop transmitting the uplink data at the source eNB in step 806.

In order to solve the problem in the uplink data transmission in the present invention, according to the uplink receive status and the uplink count received in the message of the step 804 and in combination with the uplink data that is forwarded by the source eNB and received from the source eNB, the target eNB updates the uplink receive status and then transmits the updated uplink receive status to the UE. If the target eNB still continues receiving the data forwarded from the source eNB after the RACH is successful, the target eNB forms a new uplink receive status upon receiving all forwarded data from the source eNB. The target eNB knows that the source eNB has finished data forwarding according to an end marker.

Step 806: By the UE, an RRC connection reconfiguration completion message is transmitted to the target eNB. After the step 803, the source eNB simultaneously transmits the downlink data to the UE and forwards the downlink data to the target eNB. Therefore, a part of the forwarded data received from the source eNB by the target eNB may be already received by the UE. There are following ways for the target eNB to detect data that don't need to be transmitted to the UE.

According to the PDCP status report received from the UE, the target eNB knows the next PDCP SN expected to be received by the UE. The target eNB detects duplicated data packets that do not need to be transmitted to the UE, and discards the data that has been received by the UE, and transmits data packet to the UE directly starting from the next data packet expected by the UE.

The PDCP status report transmitted to the target eNB by the UE contains the PDCP SN of the next data packet expected to be received and an HFN corresponding to the PDCP SN. The UE can merely contain an HFN corresponding to the PDCP SN of the next data packet expected to be received in the PDCP status transmitted to an eNB during the enhanced handover process. If the handover is not an enhanced handover, the target eNB knows the HFN corresponding to the PDCP SN of the next data packet expected to be received according to the existing principle.

In order to solve the problem in the uplink data transmission in the present invention, according to the uplink receive status and the uplink count received in the message of the step 704 and in combination with the uplink data that is forwarded by the source eNB and received from the source eNB, the target eNB updates the uplink receive status and then transmits the updated uplink receive status to the UE. The target eNB needs to form a new uplink receive status after all the forwarded data has been received from the source eNB. The target eNB knows that the source eNB has finished data forwarding according to an end marker. The target eNB transmits the generated uplink receive status to the UE.

According to the uplink receive status received from the target eNB and in combination with the data transmitted by the UE at the source eNB and the feedback received from the source eNB, the UE transmits uplink data to the target eNB starting from the next data packet that has not been received by the source eNB.

Step 807: By the target eNB, a path handover request message is transmitted to an MME.

Step 808: By the MME, a path handover request response message is transmitted to the target eNB.

Step 809: By the target eNB, a UE context release message is transmitted to the source eNB.

Now, the fifth method for supporting seamless handover provided by the present invention has been described. By this method, the interruption time of data transmission during the handover process can be reduced, the continuous transmission of uplink and downlink data can be ensured, and the missing or duplication transmission of data can be avoided. Particularly, the problem that the target eNB does not know an HFN corresponding to the next PDCP SN expected by the UE is solved. Thus, even if the source eNB and the target eNB are from different manufacturers, the interoperability between the two eNBs is ensured, and the interruption time of data transmission during the handover process is reduced while ensuring the operability during the enhanced handover process.

FIG. 9 is a schematic diagram of an embodiment for dual connectivity of the fourth and fifth methods for supporting seamless handover according to the present invention. This method comprises the following steps.

Step 901: By a Master eNB (MeNB), a Secondary eNB (SeNB) addition request message is transmitted to a Target SeNB (T-SeNB).

The MeNB decides to adopt an enhanced handover process. The principle for the enhanced handover process is the same as that in the step 701. Specifically, in the SeNB change process, the enhanced handover process means that the S-SeNB still transmits downlink data to a UE and still receives uplink data from the UE during the handover execution process. More specifically, after the MeNB has transmitted an RRC connection reconfiguration message, or after the MeNB has transmitted an RRC connection reconfiguration message and before the T-SeNB receives an RACH access from the UE, or after the MeNB has transmitted an RRC connection reconfiguration message and before the MeNB receives the RRC connection reconfiguration from the UE, the S-SeNB still transmits downlink data to the UE and also receives uplink data from the UE. In this embodiment, the supporting the enhanced handover means supporting an enhanced SeNB change process.

The MeNB decides, according to the capability of the UE, the capability for supporting the enhanced handover of the MeNB, and the capability for supporting the enhanced handover of the S-SeNB and/or the T-SeNB, whether to adopt the enhanced handover. The MeNB can also decide to adopt the enhanced handover process by taking other information (e.g., QoS) into consideration, without influencing the main contents of the present invention.

In the present invention, there are following methods to indicate the T-SeNB that an enhanced handover process is adopted.

Method 1: By containing enhanced handover indication information in the SeNB addition request message, the MeNB indicate to the T-SeNB that this handover process is an enhanced handover process. The MeNB decides to adopt the enhanced handover process according to its support for the enhanced handover process and the capability of the UE. The source eNB can also decide to adopt the enhanced handover process by considering the capability for supporting the enhanced handover process of the S-SeNB and/or the T-SeNB. The MeNB knows the capability for supporting the enhanced handover process of the S-SeNB and/or the T-SeNB through an Operation & Maintenance (O&M) configuration or an X2 establishment process. Corresponding to the a method using the X2 establishment process, both an X2 establishment request and an X2 establishment response message contain the capability for supporting the enhanced handover process of an eNB transmitting the message. An eNB receiving the X2 establishment request message or the X2 establishment response message maintains the received capability for supporting the enhanced handover process of the opposite eNB.

Method 2: The capability for supporting the enhanced handover of the UE is contained in the SeNB addition request message. If the T-SeNB supports the enhanced handover process, the T-SeNB know that this handover process is an enhanced handover process according to the capability for supporting the enhanced handover process of the MeNB and/or the S-SeNB and the capability for supporting the enhanced handover of the UE. The MeNB acquires, from the UE, the capability for supporting the enhanced handover of the UE. The T-SeNB knows the capability for supporting the enhanced handover process of the MeNB and/or the S-SeNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message or the X2 establishment response message maintains the received capability for supporting the enhanced handover process of the opposite eNB. Corresponding to this method, if it is assumed that the MeNB supports the enhanced handover process, the MeNB will initiate an enhanced handover process when initiating a handover to a UE supporting the enhanced handover. Or, if it is assumed that all the MeNB, the S-SeNB and the T-SeNB support the enhanced handover process, the MeNB will initiate an enhanced handover process when initiating a handover to a UE supporting the enhanced handover.

Step 902: By the T-SeNB, an SeNB addition request acknowledge message is transmitted to the MeNB.

If the T-SeNB receives the enhanced handover indication information from the MeNB, the T-SeNB contains the enhanced handover indication information in an RRC container of the SeNB addition request acknowledge message. The enhanced handover indication information is transmitted to the UE via the RRC container. Here, the RRC container is a container from the SeNB to the MeNB.

Step 903: By the MeNB, an SeNB release request message is transmitted to a Source SeNB (S-SeNB) if resources for the T-SeNB are allocated successfully. If the data is to be forwarded, the MeNB provides the S-SeNB with a data forwarding address.

In the present invention, there are following methods to indicate to the S-SeNB that an enhanced handover process is adopted by the MeNB.

Method 1: By containing enhanced handover indication information in the SeNB release request message, the MeNB indicates to the S-SeNB that this handover process is an enhanced handover process. A method for deciding to adopt the enhanced handover process by the MeNB is the same as that in the step 901 and will not be repeated here.

Method 2: The capability for supporting the enhanced handover of the UE is contained in the SeNB addition release message. If the S-SeNB supports the enhanced handover process, the S-SeNB knows that this handover process is an enhanced handover process according to the capability for supporting the enhanced handover process of the MeNB and/or the T-SeNB and the capability for supporting the enhanced handover of the UE. The MeNB acquires, from the UE, the capability for supporting the enhanced handover of the UE. The S-SeNB knows the capability for supporting the enhanced handover process of the MeNB and/or the T-SeNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message or the X2 establishment response message maintains the received capability for supporting the enhanced handover process of the opposite eNB. Corresponding to this method, if it is assumed that the MeNB supports the enhanced handover process, the MeNB will initiate an enhanced handover process when initiating a handover process to a UE supporting the enhanced handover. Or, if it is assumed that all the MeNB, the S-SeNB and the T-SeNB support the enhanced handover process, the MeNB will initiate an enhanced handover process when initiating a handover to a UE supporting the enhanced handover.

Upon receiving the SeNB release message, the S-SeNB continues transmitting data to the UE. The S-SeNB can start to forward the data. The SeNB continues receiving uplink data from the UE.

Corresponding to a split bearer, the S-SeNB continues transmitting uplink data to the MeNB. Corresponding to a Second Cell Group (SCG) bearer, the S-SeNB continues transmitting uplink data to an SGW.

For an SCG bearer, the S-SeNB continues feedback an uplink data receive status to the UE after this step. Thus, the UE knows which data packets have been already received from the UE by the S-SeNB. Accordingly, upon transmitting a message in step 907, the UE knows a data packet staring from which the data packet should be transmitted to the T-SeNB.

Step 904: By the MeNB, an RRC connection reconfiguration message is transmitted to a UE. This message contains the enhanced handover indication information. The MeNB continues transmitting downlink data to the S-SeNB. The MeNB also forwards the downlink data to the T-SeNB. Corresponding to a method provided by the present invention, the data packets continuously transmitted to the UE by the S-SeNB are at most the number of data packets within the maximum PDCP SN range minus 1 starting from the first data packet forwarded to the T-SeNB. For example, if the first data packet forwarded to the T-SeNB by the S-SeNB has a PDCP SN of 5 and an HFN of 10, the data packets transmitted to the UE by the S-SeNB at most have a PDCP SN of 3 and an HFN of 11.

The UE receives the RRC connection reconfiguration message. The UE does not delete or reset the configuration for the S-SeNB. The UE continues receiving the downlink data transmitted by the S-SeNB. The UE continues transmitting the uplink data to the S-SeNB. According to the enhanced handover indication information contained in the received RRC connection reconfiguration message, the UE knows that this handover process is an enhanced handover process, so that the UE continues transmitting and receiving data at the source eNB.

Step 905: By the UE, an RRC connection reconfiguration completion message is transmitted to the MeNB.

Step 906: By the MeNB, an SeNB reconfiguration completion message is transmitted to the T-SeNB.

Step 907: The UE is synchronized to the T-SeNB.

The UE stops receiving the downlink data from the S-SeNB, and also stops transmitting the uplink data to the S-SeNB.

Step 908*a*: By the S-SeNB, an SN status transfer is transmitted to the MeNB.

Step 908*b*: By the MeNB, the SN status transfer is transmitted to the T-SeNB.

Step 909: By the S-SeNB, the data is forwarded to the T-SeNB. Corresponding to the split bearer, the S-SeNB forwards the data to the MeNB, and then the MeNB forwards the data to the T-SeNB. For the SCG bearer, like the split bearer, the S-SeNB can forward the data to the T-SeNB via the MeNB, or the S-SeNB can directly forward the data to the T-SeNB. Depending on the implementation, the forwarding the data to the T-SeNB by the S-SeNB can be executed at any time after the step 903.

After the step 903, the S-SeNB simultaneously transmits the downlink data to the UE and forwards the downlink data to the T-SeNB. Therefore, a part of the forwarded data received from the S-SeNB by the T-SeNB may be already received by the UE. The T-SeNB detects data that don't need to be transmitted to the UE in the following ways.

For the SCG bearer, according to the PDCP status report received from the UE, the T-SeNB knows the next PDCP SN expected to be received by the UE. The target eNB detects duplicated data packets that don't need to be transmitted to the UE, and discards the data that has been received by the UE, and transmits data packet to the UE directly starting from the next data packet expected by the UE.

For the SCG bearer, the PDCP status report transmitted to the T-SeNB by the UE merely contains the PDCP SN of the next data packet expected to be received, but does not contain an HFN corresponding to the PDCP SN. There are following two ways for the T-SeNB to know an HFN corresponding to the PDCP SN of the next data packet expected to be received.

Way 1:

By the method described in the step 901, the T-SeNB can know whether this handover process is an enhanced handover process. For the enhanced handover process, the T-SeNB transmits data to the UE and/or transmits uplink data to the SGW by the method for the enhanced handover process.

The T-SeNB considers that the data packet corresponding to the next expected PDCP SN contained in the PDCP status received from the UE is a first data packet corresponding to this PDCP SN stored in a buffer of the T-SeNB. The maximum number of data packets transmitted to the UE by the S-SeNB starting from the first data packet forwarded to the T-SeNB is the number of data packets within the maximum PDCP SN range minus 1. For example, if the first data packet received from the S-SeNB by the T-SeNB has a PDCP SN of 5 and an HFN of 10, the data packets transmitted to the UE by the S-SeNB at most have a PDCP SN of 3 and an HFN of 11. Therefore, the maximum data packet received from the S-SeNB by the UE has a PDCP SN of 3 and an HFN of 11. If the data transmitted by the S-SeNB all has been received by the UE, the UE expects that the next received data packet has a PDCP SN of 4 and an HFN of 11. Therefore, this data packet is a first corresponding data packet to having a PDCP SN of 4 in the buffer of the T-SeNB, and the HFN corresponding to this data packet is 11. If some data packets transmitted by the S-SeNB have not been received by the UE, for example, if the next expected PDCP SN in the PDCP status received from the UE by the T-SeNB is 9, this data packet is a first corresponding data packet having a PDCP SN of 9 in the buffer of the T-SeNB, and the T-SeNB knows that the corresponding HFN is 10. Therefore, if there are data packets having a same PDCP SN in the buffer of the T-SeNB, a first data packet not receiving a data packet SN in the first corresponding UE PDCP status report is the next data packet to be transmitted to the UE. In this way, the T-SeNB knows an HFN corresponding to this data packet.

Or, for the enhanced handover process, the T-SeNB considers that the next expected PDCP SN contained in the PDCP status received from the UE is not far from a half of the PDCP SN range of the PDCP SN in the DL count received in the SN status transfer message. In other words, if the maximum value of the PDCP SN is N, the next expected PDCP SN is not far from N/2 of the PDCP SN in the DL count. The S-SeNB also follows this principle, when transmitting data to the UE after transmitting the SN status transfer message. For example:

in the DL count, the HFN is 10, and the PDCP SN is 8;
the PDCP SN is 7 bits (the range of the SN is from 0 to 127);
when the next expected PDCP SN received from the UE by the T-SeNB is 73 to 127, the HFN is 9; and
when the next expected PDCP SN received from the UE by the T-SeNB is 0 to 72, the HFN is 10.

Upon transmitting the SN status transfer message, the S-SeNB continues transmitting the data to the UE, and then stops transmitting downlink data packets to the UE after the PDCP SN is 72 and the HFN is 10.

Corresponding to the enhanced handover process, if the next expected PDCP SN in the PDCP status received from the UE by the T-SeNB is 9, the T-SeNB knows that the corresponding HFN is 10. If the handover is not an enhanced handover, the T-SeNB knows that the corresponding HFN is 9.

Way 2:

The PDCP status report transmitted to the T-SeNB by the UE contains the PDCP SN of the next data packet expected to be received and an HFN corresponding to the PDCP SN. The UE can merely contain an HFN corresponding to the PDCP SN of the next data packet expected to be received in the PDCP status transmitted to an eNB during the enhanced handover process. If the handover is not an enhanced handover, the T-SeNB knows the HFN corresponding to the PDCP SN of the next data packet expected to be received according to the existing principle.

For the split bearer, the MeNB can know the receive status of the UE, and thus transmit corresponding data to the T-SeNB.

In order to solve the problem in the uplink data transmission in the present invention, according to the uplink receive status and the uplink count received in the message of the step 908*b* and in combination with the received uplink data forwarded by the S-SeNB, the T-SeNB updates the uplink receive status and then transmits the updated uplink receive status to the UE. The T-SeNB needs to form a new uplink receive status after all the forwarded data has been received from the S-SeNB. The T-SeNB knows that the S-SeNB has forwarded all the data according to an end marker. The T-SeNB transmits the generated uplink receive status to the UE. According to the uplink receive status received from the T-SeNB and in combination with the data transmitted at the S-SeNB by the UE and the feedback received from the S-SeNB, the UE transmits uplink data to the T-SeNB starting from the next data packet that has not been received by the S-SeNB. This method is specific to an SCG bearer.

For a split bearer, the steps 908*a* and 908*b* can be executed at any time after the step 903.

Step 910: By the MeNB, a UE context release request message is transmitted to the S-SeNB.

The detailed descriptions of steps irrelevant to the main contents of the present application are omitted here, for example, the ERAB modification indication process between the MeNB and the MME.

Now, the embodiment for dual connectivity of the fourth and fifth methods for supporting seamless handover provided by the present application has been described. By this method, the interruption time of data transmission during the handover process can be reduced, the continuous transmission of uplink and downlink data can be ensured, and the missing or duplication transmission of data can be avoided. Particularly, the problem that the T-SeNB does not know an HFN corresponding to the next PDCP SN expected by the UE is solved. Thus, even if the MeNB, the S-SeNB and the T-SeNB are from different manufacturers, the interoperability between the eNBs is ensured, and the interruption time of data transmission during the handover process is reduced while ensuring the operability during the enhanced handover process.

The SeNB addition process in the TS36.300 10.1.2.8.1 can also be used by the MeNB to decide to adopt an enhanced handover process. A specific method comprises the following steps.

1) The MeNB decides to adopt an enhanced handover process, and informs an SeNB through an SeNB addition request message.

2) The SeNB contains enhanced handover indication information in a container from the SeNB to the MeNB of an SeNB addition request acknowledge message, and then transmits this message to a UE by the MeNB.

3) The MeNB transmits an RRC reconfiguration request message to the UE, this message containing the enhanced handover indication information.

4) The UE knows this handover is an enhanced handover process in accordance with the step 3).

The steps focus on the method for deciding to adopt the enhanced handover process, and the data transmission, data receipt and data forwarding of eNBs are similar to those in FIGS. 7 and 9 and will not be described in details here.

The SeNB modification process in the TS36.300 10.1.2.8.2 can also be used by the MeNB to decide to adopt an enhanced handover process. A specific method comprises the following steps.

1) The MeNB decides to adopt an enhanced handover process, and informs an SeNB through an SeNB modification request message.

2) The SeNB contains enhanced handover indication information in a container from the SeNB to the MeNB of an SeNB modification request acknowledge message, and then transmits this message to a UE by the MeNB.

3) The MeNB transmits an RRC reconfiguration request message to the UE, this message containing the enhanced handover indication information.

4) The UE knows this handover is an enhanced handover process in accordance with the step 3).

The internal handover of the MeNB in the TS36-300 10.1.2.8.2.1 involves an SCG change process, and can also be used by the MeNB to decide to adopt an enhanced handover process. A specific method is the same as the above method and will not be repeated there.

The steps focus on the method for deciding to adopt the enhanced handover process, and the data transmission, data receipt and data forwarding of eNBs are similar to those in FIGS. 7 and 9 and will not be described in details here.

The SeNB release process in the TS36.300 10.1.2.8.3 can also be used by the MeNB to decide to adopt an enhanced handover process. A specific method comprises the following steps.

1) The MeNB decides to adopt an enhanced handover process, and then informs an SeNB through an SeNB release request message (an SeNB release process initiated by the MeNB) or an SeNB release acknowledge (an SeNB release process initiated by the SeNB).

2) The MeNB transmits enhanced handover indication information to a UE.

3) The MeNB transmits an RRC reconfiguration request message to the UE, this message containing the enhanced handover indication information.

4) The UE knows this handover is an enhanced handover process in accordance with the step 3).

The steps focus on the method for deciding to adopt the enhanced handover process, and the data transmission, data receipt and data forwarding of eNBs are similar to those in FIGS. 7 and 9 and will not be described in details here.

The change process from an MeNB to an eNB in the TS36.300 10.1.2.8.5 can also be used by a source MeNB to decide to adopt an enhanced handover process. A specific method comprises the following steps.

1) The source MeNB decides to adopt an enhanced handover process, and informs a target eNB through a handover request message.

2) The target eNB contains enhanced handover indication information in an RRC container of a handover request acknowledge message, and then transmits this message to a UE by the source MeNB.

3) The source MeNB informs an S-SeNB of the enhanced handover indication information through an SeNB release request. The S-SeNB continues transmitting data to the UE and receiving uplink data from the UE.

4) The source MeNB transmits an RRC reconfiguration request message to the UE, this message containing the enhanced handover indication information.

5) The UE knows this handover is an enhanced handover process in accordance with the step 4).

The steps focus on the method for deciding to adopt the enhanced handover process, and the data transmission, data receipt and data forwarding of eNBs are similar to those in FIGS. 7 and 9 and will not be described in details here.

The change process from an eNB to an MeNB in the TS36.300 10.1.2.8.7 can also be used by a source eNB to decide to adopt an enhanced handover process. A specific method comprises the following steps.

1) The source eNB decides to adopt an enhanced handover process, and informs a target MeNB through a handover request message.

2) The target MeNB informs a T-SeNB of the enhanced handover indication information through an SeNB addition request message.

3) The T-SeNB contains the enhanced handover indication information in an RRC container of an SeNB addition request acknowledge message. The T-SeNB contains the enhanced handover indication information in an RRC container of a handover request acknowledge message, and then transmits this message to a UE via the source eNB. Or, the T-SeNB directly contains the enhanced handover indication information in the RRC container of the handover request acknowledge message, and does not contain the enhanced handover indication information in the RRC container of the SeNB addition request acknowledge message.

4) The source eNB transmits an RRC reconfiguration request message to the UE, this message containing the enhanced handover indication information.

5) The UE knows this handover is an enhanced handover process in accordance with the step 4).

The steps focus on the method for deciding to adopt the enhanced handover process, and the data transmission, data receipt and data forwarding of eNBs are similar to those in FIGS. 7 and 9 and will not be described in details here.

A scenario of performing handover between different MeNBs without changing an SeNB in the TS36.300 10.1.2.8.8 can also be used by a source MeNB to decide to adopt an enhanced handover process. A specific method is a combination of the change process from an MeNB to an eNB in the TS36.300 10.1.2.8.5 and the change process from an eNB to an MeNB in the TS36.300 10.1.2.8.7, and will not be repeated here.

FIG. 10 shows a sixth method for supporting seamless handover according to the present invention. This method comprises the following steps.

Step 1001: By a source eNB, a handover request message is transmitted to a target eNB.

The message contains the capability for supporting the enhanced handover of a UE. The capability for supporting the enhanced handover of the UE means that, upon receiving the RRC connection reconfiguration message, the UE may not freeze the transmission and receive status at the source eNB and not reset or empty the information at the layer 2 (L2) of the source eNB, and may continue receiving or transmitting data from the source eNB. The specific meaning of the capability for supporting the enhanced handover of the UE is the same as that in the step 701 and will not be repeated here. The capability for supporting the enhanced handover of the UE can be contained in a Radio Resource Control (RRC) container. The source eNB can also contain an information element (supporting the enhanced handover process) in the handover request message. By using this information element, the source eNB informs the target eNB that the source eNB supports the enhanced handover; or, by using this information element, the source eNB informs the target eNB that both the source eNB and the UE support the enhanced handover process. The meaning of the enhanced handover process is the same as that in the step 701 and will not be repeated here.

Step 1002: By the target eNB, a handover request acknowledge message is transmitted to the source eNB.

In this method, the target eNB decides to adopt an enhanced handover process. The target eNB decides to adopt the enhanced handover process according to its support for the enhanced handover process and the capability of the UE. Or, the target eNB decides to adopt the enhanced handover process according to its support for the enhanced handover process, the capability of the UE, and the capability for supporting the enhanced handover process of the source eNB. The target eNB can also decide to adopt the enhanced handover process by taking the requirements for a service (e.g., Quality of service (QoS) information) into consideration. The target eNB can also decide to adopt the enhanced handover process by taking other information into consideration, without influencing the main contents of the present invention. The target eNB acquires, from the UE, the capability for supporting the enhanced handover of the UE. The target eNB knows the capability for supporting the enhanced handover process of the source eNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message and the X2 establishment response message maintains the received capability for supporting the enhanced handover process of the opposite eNB. Corresponding to the method of informing, by the source eNB, the target eNB that both the source eNB and the UE support the enhanced handover process by containing an information element of supporting the enhanced handover process in the handover request message in the step 1001, the target eNB can know, through the received information element, that both the source eNB and the UE support the enhanced handover process.

In the present invention, there are following methods to indicate to the source eNB that an enhanced handover process is adopted.

Method 1: By containing enhanced handover indication information in the handover request acknowledge message, the target eNB indicates to the source eNB to adopt the enhanced handover process. The enhanced handover indication information is also contained in an RRC container from the target eNB to the source eNB, and is transmitted to the UE by the source eNB.

Method 2: The enhanced handover indication information is contained in an RRC container. Upon receiving the handover request acknowledge message, the source eNB informs and views the RRC container and thus knows this handover process is an enhanced handover process. The source eNB transmits the RRC container to the UE, so that the UE is indicated that this handover is an enhanced handover process.

Step 1003: By the source eNB, an RRC connection reconfiguration message is transmitted to a UE. This message contains the enhanced handover indication information. Corresponding to the enhanced handover process, the source eNB continues transmitting downlink data to the UE. Corresponding to a method provided by the present invention, the data packets continuously transmitted to the UE by the source eNB are at most the number of data packets within the maximum PDCP SN range minus 1 starting from the first data packet forwarded to the target eNB. For example, if the first data packet forwarded to the target eNB by the source eNB has a PDCP SN of 5 and an HFN of 10, the data packets transmitted to the UE by the source eNB at most have a PDCP SN of 3 and an HFN of 11. According to the enhanced handover indication information received in the step 1002 or by viewing the enhanced handover indication information in the RRC container, the source eNB knows that the enhanced handover process is adopted.

The source eNB continues receiving uplink data from the UE. Upon receiving this message, the UE continues receiving the downlink data transmitted by the source eNB, and continues transmitting the uplink data at the source eNB. According to the enhanced handover indication information contained in the received RRC connection reconfiguration message, the UE knows that this handover process is an enhanced handover process, so that the UE continues transmitting and receiving data at the source eNB.

In order to solve the problem in the uplink data transmission in the present invention, one corresponding method is that the source eNB continues feeding an uplink data receive status back to the UE after this step or after step 1004. Thus, the UE knows which data packets have been already received from the UE by the source eNB. Accordingly, upon transmitting a message in step 1006, the UE knows a data packet starting from which the data packet should be transmitted to the target eNB.

Step 1004: By the source eNB, a Sequence Number (SN) status transfer is transmitted to the target eNB.

The source eNB can inform the target eNB of the maximum number of data packets transmitted to the UE starting from the first data packet forwarded to the target eNB during the enhanced handover process, for example, the number of data packets within the maximum PDCP SN range minus 1, or more. For example, if the PDCP SN is from 0 to 127, the data packets within the maximum PDCP SN range minus 1 are 127 PDCP SDUs or PDUs.

In this step, the source eNB does not freeze the transmission and receive status.

The source eNB starts to forward data to the target eNB. The source eNB also forwards, to the target eNB, the downlink data that is transmitted to the UE.

The source eNB forwards, to the target eNB, the uplink data packets received from the UE. One method is as follows: the source eNB forwards, to the target eNB, all the received uplink packets including the data packets received in-sequence or out-of-sequence after the SN status transfer message. Another method is as follows: the source eNB transmit the received data packets in sequence an SGW, and forwards the received data packets out of sequence to the target eNB.

Step 1005: The UE is synchronized to the target eNB. The UE accesses to a target cell via a Random Access Channel (RACH).

In the present invention, the UE can stop receiving the downlink data from the source eNB and stop transmitting the uplink data at the source eNB in this step. Or, the UE can stop receiving the downlink data from the source eNB and stop transmitting the uplink data at the source eNB in step 1006.

In order to solve the problem in the uplink data transmission in the present invention, according to the uplink receive status and the uplink count received in the message of the step 1004 and in combination with the uplink data that is forwarded by the source eNB and received from the source eNB, the target eNB updates the uplink receive status and then transmits the updated uplink receive status to the UE. If the target eNB still continues receiving the data forwarded from the source eNB after the RACH is successful, the target eNB forms a new uplink receive status upon receiving all forwarded data from the source eNB. The target eNB knows that the source eNB has finished data forwarding according to an end marker.

Step 1006: By the UE, an RRC connection reconfiguration completion message is transmitted to the target eNB. After the step 1003, the source eNB simultaneously transmits the downlink data to the UE and forwards the downlink data to the target eNB. Therefore, a part of the forwarded data received from the source eNB by the target eNB may be already received by the UE. There are following ways for the target eNB to detect data that don't need to be transmitted to the UE.

According to the PDCP status report received from the UE, the target eNB knows the next PDCP SN expected to be received by the UE. The target eNB detects duplicated data packets that do not need to be transmitted to the UE, and discards the data that has been received by the UE, and transmits data packet to the UE directly starting from the next data packet expected by the UE.

The PDCP status report transmitted to the target eNB by the UE merely contains the PDCP SN of the next data packet expected to be received, but does not contain an HFN corresponding to the PDCP SN.

In the step 1002, the target eNB has decided that this handover adopts the enhanced handover process. For the enhanced handover process, the target eNB transmits data to the UE and/or transmits uplink data to an SGW by the method for the enhanced handover process. The target eNB determines an HFN corresponding to the PDCP SN of the next data packet expected to be received by the UE according to the enhanced handover process.

The target eNB considers that the data packet corresponding to the next expected PDCP SN contained in the PDCP status received from the UE is a first data packet corresponding to this PDCP SN stored in a buffer of the target eNB. The maximum number of data packets transmitted to the UE by the source eNB starting from the first data packet forwarded to the target eNB is the number of data packets within the maximum PDCP SN range minus 1. For example, if the first data packet received from the source eNB by the target eNB has a PDCP SN of 5 and an HFN of 10, the data packets transmitted to the UE by the source eNB at most have a PDCP SN of 3 and an HFN of 11, so the maximum data packet received from the source eNB by the UE has a PDCP SN of 3 and an HFN of 11. If the data transmitted by the source eNB all has been received by the UE, the UE expects that the next received data packet has a PDCP SN of 4 and an HFN of 11. Therefore, this data packet is a first corresponding data packet to having a PDCP SN of 4 in the buffer of the target eNB, and the HFN corresponding to this data packet is 11. If some data packets transmitted by the source eNB have not been received by the UE, for example, if the next expected PDCP SN in the PDCP status received from the UE by the target eNB is 9, this data packet is a first corresponding data packet having a PDCP SN of 9 in the buffer of the target eNB, and the target eNB knows that the corresponding HFN is 10. Therefore, if there are data packets having a same PDCP SN in the buffer of the target eNB, a first data packet not receiving a data packet SN in the first corresponding UE PDCP status report is the next data packet to be transmitted to the UE. In this way, the target eNB knows an HFN corresponding to this data packet.

Or, the target eNB considers that the next expected PDCP SN contained in the PDCP status received from the UE is not far from a half of the PDCP SN range of the PDCP SN in the DL count received in the SN status transfer message. In other words, if the maximum value of the PDCP SN is N, the next expected PDCP SN is not far from N/2 of the PDCP SN in the DL count. The source eNB also follows this principle, when transmitting data to the UE after transmitting the SN status transfer message. For example:

in the DL count, the HFN is 10, and the PDCP SN is 8;
    the PDCP SN is 7 bits (the range of the SN is from 0 to 127);
    when the next expected PDCP SN received from the UE by the target eNB is 73 to 127, the HFN is 9; and
    when the next expected PDCP SN received from the UE by the target eNB is 0 to 72, the HFN is 10.

Upon transmitting the SN status transfer message, the source eNB continues transmitting the data to the UE, and then stops transmitting downlink data packets to the UE after the PDCP SN is 72 and the HFN is 10.

Corresponding to the enhanced handover process, if the next expected PDCP SN in the PDCP status received from the UE by the target eNB is 9, the target eNB knows that the corresponding HFN is 10. If the handover is not an enhanced handover, the target eNB knows that the corresponding HFN is 9.

In order to solve the problem in the uplink data transmission in the present invention, according to the uplink receive status and the uplink count received in the message of the step 1004 and in combination with the uplink data that is forwarded by the source eNB and received from the source eNB, the target eNB updates the uplink receive status and then transmits the updated uplink receive status to the UE. The target eNB needs to form a new uplink receive status after all the forwarded data has been received from the source eNB. The target eNB knows that the source eNB has finished data forwarding according to an end marker. The target eNB transmits the generated uplink receive status to the UE.

According to the uplink receive status received from the target eNB and in combination with the data transmitted by the UE at the source eNB and the feedback received from the source eNB, the UE transmits uplink data to the target eNB starting from the next data packet that has not been received by the source eNB.

Step 1007: By the target eNB, a path handover request message is transmitted to an MME.

Step 1008: By the MME, a path handover request response message is transmitted to the target eNB.

Step 1009: By the target eNB, a UE context release message is transmitted to the source eNB.

Now, the sixth method for supporting seamless handover provided by the present invention has been described. By this method, the interruption time of data transmission during the handover process can be reduced, the continuous transmission of uplink and downlink data can be ensured, and the missing or duplication transmission of data can be avoided. Particularly, the problem that the target eNB does not know an HFN corresponding to the next PDCP SN expected by the UE is solved. Thus, even if the source eNB and the target eNB are from different manufacturers, the interoperability between the two eNBs is ensured, and the interruption time of data transmission during the handover process is reduced while ensuring the operability during the enhanced handover process.

FIG. 11 is a schematic diagram of an embodiment for dual connectivity of the sixth method for supporting seamless handover according to the present invention. This method comprises the following steps.

Step 1101: By a Master eNB (MeNB), a Secondary eNB (SeNB) addition request message is transmitted to a Target SeNB (T-SeNB).

The message contains the capability for supporting the enhanced handover of a UE. The capability for supporting the enhanced handover of the UE means that the UE supports a handover process for maintaining a connection to a source eNB as discussed in the 3GPP Rel-14. Specifically, the capability for supporting the enhanced handover of the UE means that, upon receiving an RRC connection reconfiguration message, the UE may not freeze the transmission and receive status at the source eNB and not reset or empty the information at the layer 2 (L2) of an S-SeNB, and may continue receiving or transmitting data from the S-SeNB. More specifically, the specific meaning of the capability for supporting the enhanced handover of the UE is the same as that in the step 701 and will not be repeated here. The capability for supporting the enhanced handover of the UE can be contained in a Radio Resource Control (RRC) container. Here, the RRC container is a container from the MeNB to the SeNB. The MeNB can also contain an information element (supporting the enhanced handover process) in the SeNB addition request message. By using this information element, the MeNB informs the T-SeNB that the MeNB supports the enhanced handover; or, by using this information element, the MeNB informs the T-SeNB that both the MeNB and the UE support the enhanced handover process. The meaning of the enhanced handover process is the same as that in the step 901 and will not be repeated here.

Step 1102: By the T-SeNB, an SeNB addition request acknowledge message is transmitted to the MeNB.

In this method, the T-SeNB decides to adopt an enhanced handover process. The T-SeNB decides, according to the capability of the UE, the capability for supporting capability for supporting the enhanced handover of the MeNB, and the capability for supporting the enhanced handover of the S-SeNB and/or the T-SeNB, whether to adopt the enhanced handover. The T-SeNB can also decide to adopt the enhanced handover process by taking other information (e.g., QoS) into consideration, without influencing the main contents of the present invention. The T-SeNB acquires, from the MeNB, the capability for supporting the enhanced handover of the UE. The T-SeNB knows the capability for supporting the enhanced handover process of the MeNB and the S-SeNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message and the X2 establishment response message maintains the received capability for supporting the enhanced handover process of the opposite eNB. Corresponding to the method of informing, by the MeNB, the T-SeNB that both the MeNB and the UE support the enhanced handover process by containing an information element of supporting the enhanced handover process in the SeNB addition request message in the step 1101, the T-SeNB can know, through the received information element, that both the MeNB and the UE support the enhanced handover process.

In the present invention, there are following methods to indicate to the MeNB that an enhanced handover process is adopted.

Method 1: By containing enhanced handover indication information in the SeNB addition request acknowledge message, the T-SeNB indicate to the MeNB to adopt an enhanced handover process. The enhanced handover indication is also contained in a container from the SeNB to the MeNB, and is transmitted to the UE by the MeNB.

Method 2: The enhanced handover indication information is contained in a container from the SeNB to the MeNB. Upon receiving the SeNB addition request acknowledge message, the MeNB informs and views the container from the SeNB to the MeNB and thus knows this handover process is an enhanced handover process. The MeNB transmits, to the UE, the container from the SeNB to the MeNB, so that the UE is indicated that this handover process is an enhanced handover process.

Step 1103: If resources for the T-SeNB are allocated successfully, by the MeNB, an SeNB release request message is transmitted to a Source SeNB (S-SeNB). If the data is to be forwarded, the MeNB provides the S-SeNB with a data forwarding address.

In the present invention, there are following methods to indicate the S-SeNB that the MeNB adopts the enhanced handover process.

Method 1: By containing the enhanced handover indication information in the SeNB release request message, the MeNB indicates to the S-SeNB that this handover process is an enhanced handover process. The MeNB knows that this process is an enhanced handover process in accordance with the step 1102.

Method 2: The capability for supporting the enhanced handover of the UE is contained in the SeNB addition release message. If the S-SeNB supports the enhanced handover process, the S-SeNB knows, according to the capability for supporting the enhanced handover process of the MeNB and/or the T-SeNB and the capability for supporting the enhanced handover of the UE, knows that this handover process is an enhanced handover process. The MeNB acquires, from the UE, the capability for supporting the enhanced handover of the UE. The S-SeNB knows the capability for supporting the enhanced handover process of the MeNB and/or the T-SeNB through an Operation & Maintenance (O&M) configuration or an X2 establishment process. Corresponding to the a method using the X2 establishment process, both an X2 establishment request message and an X2 establishment response message contain the capability for supporting the enhanced handover process of an eNB transmitting the message. An eNB receiving the X2 establishment request message or the X2 establishment response message maintains the received capability for supporting the enhanced handover process of the opposite eNB. Corresponding to this method, if it is assumed that the MeNB, the S-SeNB and the T-SeNB all support the enhanced handover process, an enhanced handover process will be initiated when a handover to a UE supporting the enhanced handover is initiated.

Upon receiving the SeNB release message, the S-SeNB continues transmitting data to the UE. The S-SeNB can start to forward the data. The SeNB continues receiving uplink data from the UE.

Corresponding to a split bearer, the S-SeNB continues transmitting uplink data to the MeNB. Corresponding to a Second Cell Group (SCG) bearer, the S-SeNB continues transmitting uplink data to an SGW.

For an SCG bearer, the S-SeNB continues feeding an uplink data receive status to the UE after this step. Thus, the UE knows which data packets have been already received from the UE by the S-SeNB. Accordingly, upon transmitting a message in step 1107, the UE knows a data packet starting from which the data packet should be transmitted to the T-SeNB.

Step 1104: By the MeNB, an RRC connection reconfiguration message is transmitted to a UE. This message contains the enhanced handover indication information. The MeNB continues transmitting downlink data to the S-SeNB. Meanwhile, the MeNB forwards the downlink data to the T-SeNB. Corresponding to a method provided by the present invention, the data packets continuously transmitted to the UE by the S-SeNB are at most the number of data packets within the maximum PDCP SN range minus 1 starting from the first data packet forwarded to the T-SeNB. For example, if the first data packet forwarded to the T-SeNB by the S-SeNB has a PDCP SN of 5 and an HFN of 10, the data packets transmitted to the UE by the S-SeNB at most have a PDCP SN of 3 and an HFN of 11.

The UE receives the RRC connection reconfiguration message. The UE does not delete or reset the configuration for the S-SeNB. The UE continues receiving the downlink data transmitted by the S-SeNB. The UE continues transmitting the uplink data to the S-SeNB. According to the enhanced handover indication information contained in the received RRC connection reconfiguration message, the UE knows that this handover process is an enhanced handover process, so that the UE continues transmitting and receiving data at the source eNB.

Step 1105: By the UE, an RRC connection reconfiguration completion message is transmitted to the MeNB.

Step 1106: By the MeNB, an SeNB reconfiguration completion message is transmitted to the T-SeNB.

Step 1107: The UE is synchronized to the T-SeNB.

The UE stops receiving the downlink data from the S-SeNB, and also stops transmitting the uplink data to the S-SeNB.

Step 1108*a*: By the S-SeNB, an SN status transfer is transmitted to the MeNB.

Step 1108*b*: By the MeNB, the SN status transfer is transmitted to the T-SeNB.

Step 1109: By the S-SeNB, the data is forwarded to the T-SeNB. Corresponding to the split bearer, the S-SeNB forwards the data to the MeNB, and then the MeNB forwards the data to the T-SeNB. For the SCG bearer, like the split bearer, the S-SeNB can forward the data to the T-SeNB via the MeNB, or the S-SeNB can directly forward the data to the T-SeNB. Depending on the implementation, the forwarding the data to the T-SeNB by the S-SeNB can be executed at any time after the step 1103.

After the step 1103, the S-SeNB simultaneously transmits the downlink data to the UE and forwards the downlink data to the T-SeNB. Therefore, a part of the forwarded data received from the S-SeNB by the T-SeNB may be already received by the UE. The T-SeNB detects data that is not to be transmitted to the UE in the following ways.

For the SCG bearer, according to the PDCP status report received from the UE, the T-SeNB knows the next PDCP SN expected to be received by the UE. The target eNB detects duplicated data packets that do not need to be transmitted to the UE, and discards the data that has been received by the UE, and transmits data packet to the UE directly starting from the next data packet expected by the UE.

For the SCG bearer, the PDCP status report transmitted to the T-SeNB by the UE merely contains the PDCP SN of the next data packet expected to be received, but does not contain an HFN corresponding to the PDCP SN. There are following two ways for the T-SeNB to know an HFN corresponding to the PDCP SN of the next data packet expected to be received.

Way 1:

By the method described in the step 1101, the T-SeNB can know whether this handover process is an enhanced handover process. For the enhanced handover process, the T-SeNB transmits data to the UE and/or transmits uplink data to the SGW by the method for the enhanced handover process.

The T-SeNB considers that the data packet corresponding to the next expected PDCP SN contained in the PDCP status received from the UE is a first data packet corresponding to this PDCP SN stored in a buffer of the T-SeNB. The maximum number of data packets transmitted to the UE by the S-SeNB starting from the first data packet forwarded to the T-SeNB is the number of data packets within the maximum PDCP SN range minus 1. For example, if the first data packet received from the S-SeNB by the T-SeNB has a PDCP SN of 5 and an HFN of 10, the data packets transmitted to the UE by the S-SeNB at most have a PDCP SN of 3 and an HFN of 11. Therefore, the maximum data packet received from the S-SeNB by the UE has a PDCP SN of 3 and an HFN of 11. If the data transmitted by the S-SeNB all has been received by the UE, the UE expects that the next received data packet has a PDCP SN of 4 and an HFN of 11. Therefore, this data packet is a first corresponding data packet to having a PDCP SN of 4 in the buffer of the T-SeNB, and the HFN corresponding to this data packet is 11. If some data packets transmitted by the S-SeNB have not been received by the UE, for example, if the next expected PDCP SN in the PDCP status received from the UE by the T-SeNB is 9, this data packet is a first corresponding data packet having a PDCP SN of 9 in the buffer of the T-SeNB, and the T-SeNB knows that the corresponding HFN is 10. Therefore, if there are data packets having a same PDCP SN in the buffer of the T-SeNB, a first data packet not receiving a data packet SN in the first corresponding UE PDCP status report is the next data packet to be transmitted to the UE. In this way, the T-SeNB knows an HFN corresponding to this data packet.

Way 2:

The PDCP status report transmitted to the T-SeNB by the UE contains the PDCP SN of the next data packet expected to be received and an HFN corresponding to the PDCP SN. The UE can merely contain an HFN corresponding to the PDCP SN of the next data packet expected to be received in the PDCP status transmitted to an eNB during the enhanced handover process. If the handover is not an enhanced handover, the T-SeNB knows the HFN corresponding to the PDCP SN of the next data packet expected to be received according to the existing principle.

For the split bearer, the MeNB can know the receive status of the UE, and thus transmit corresponding data to the T-SeNB.

In order to solve the problem in the uplink data transmission in the present invention, according to the uplink receive status and the uplink count received in the message of the step 1108*b* and in combination with the received uplink data forwarded by the S-SeNB, the T-SeNB updates the uplink receive status and then transmits the updated uplink receive status to the UE. The T-SeNB needs to form a new uplink receive status after all the forwarded data has been received from the S-SeNB. The T-SeNB knows that the S-SeNB has forwarded the data according to an end marker. The T-SeNB transmits the generated uplink receive status to the UE. According to the uplink receive status received from the T-SeNB and in combination with the data transmitted at the S-SeNB by the UE and the feedback received from the S-SeNB, the UE transmits uplink data to the T-SeNB starting from the next data packet that has not been received by the S-SeNB. This method is specific to an SCG bearer.

For a split bearer, the steps 1108*a* and 1108*b* can be executed at any time after the step 903.

Step 1110: By the MeNB, a UE context release request message is transmitted to the S-SeNB.

The detailed descriptions of steps irrelevant to the main contents of the present application are omitted here, for example, the ERAB modification indication process between the MeNB and the MME.

Now, the embodiment for dual connectivity of the fourth and fifth methods for supporting seamless handover provided by the present application has been described. By this method, the interruption time of data transmission during the handover process can be reduced, the continuous transmission of uplink and downlink data can be ensured, and the missing or duplication transmission of data can be avoided. Particularly, the problem that the T-SeNB does not know an HFN corresponding to the next PDCP SN expected by the UE is solved. Thus, even if the MeNB, the S-SeNB and the T-SeNB are from different manufacturers, the interoperability between the eNBs is ensured, and the interruption time of data transmission during the handover process is reduced while ensuring the operability during the enhanced handover process.

The SeNB addition process in the TS36.300 10.1.2.8.1 can also be used by the SeNB to decide to adopt an enhanced handover process. A specific method comprises the following steps.

1) The SeNB decides to adopt an enhanced handover process.

2) The SeNB contains enhanced handover indication information in a container from the SeNB to an MeNB of an SeNB addition request acknowledge message, and then transmits this message to a UE by the MeNB.

3) There are following two ways for the MeNB to know that an enhanced handover process is adopted. Way 1: the MeNB parses the enhanced handover indication information in the container from the SeNB to the MeNB in the SeNB addition request acknowledge message, and thus knows this handover process is an enhanced handover process. Way 2: The SeNB also contains the enhanced handover indication information in the SeNB addition request acknowledge message. According to the enhanced handover indication information in the SeNB addition request acknowledge message, without parsing the RRC container, the MeNB can know that the SeNB decides to adopt the enhanced handover process.

4) The MeNB transmits an RRC reconfiguration request message to a UE, this message containing the enhanced handover indication information.

5) The UE knows this handover process is an enhanced handover process in accordance with the step 4).

The steps focus on the method for deciding to adopt the enhanced handover process, and the data transmission, data receipt and data forwarding of eNBs are similar to those in FIGS. 10 and 11 and will not be described in details here.

The SeNB modification process initiated by an MeNB and an SeNB in the TS36.300 10.1.2.8.2 can also be used by the SeNB to decide to adopt an enhanced handover process. A specific method comprises the following steps.

1) The SeNB decides to adopt an enhanced handover process.

2) The SeNB contains enhanced handover indication information in a container from the SeNB to the MeNB of an SeNB modification request acknowledge message, and then transmits this message to a UE via the MeNB.

3) There are following two ways for the MeNB to know that an enhanced handover process is adopted. Way 1: The MeNB parses the enhanced handover indication information in the container from the SeNB to the MeNB in the SeNB modification request acknowledge message, and thus knows this handover process is an enhanced handover process. Way 2: The SeNB also contains the enhanced handover indication information in the SeNB modification request acknowledge message. According to the enhanced handover indication information in the SeNB modification request acknowledge message, without parsing the RRC container, the MeNB can know that the SeNB decides to adopt the enhanced handover process.

4) The MeNB transmits an RRC reconfiguration request message to a UE, this message containing the enhanced handover indication information.

5) The UE knows this handover process is an enhanced handover process in accordance with the step 4).

The steps focus on the method for deciding to adopt the enhanced handover process, and the data transmission, data receipt and data forwarding of eNBs are similar to those in FIGS. 10 and 11 and will not be described in details here.

The SeNB modification process initiated by an SeNB in the TS36.300 10.1.2.8.2 can also be used by the SeNB to decide to adopt an enhanced handover process. A specific method comprises the following steps.

1) The SeNB decides to adopt an enhanced handover process.

2) The SeNB contains enhanced handover indication information in a container from the SeNB to an MeNB of an SeNB modification request acknowledge message, and then transmits this message to a UE by the MeNB.

3) There are following two ways for the MeNB to know that an enhanced handover process is adopted. Way 1: The MeNB parses the enhanced handover indication information in the container from the SeNB to the MeNB in the SeNB modification request acknowledge message, and thus knows this handover process is an enhanced handover process. Way 2: The SeNB also contains the enhanced handover indication information in the SeNB modification request acknowledge message meanwhile. According to the enhanced handover indication information in the SeNB modification request acknowledge message, without parsing the RRC container, the MeNB can know that the SeNB decides to adopt the enhanced handover process.

4) The MeNB transmits an RRC reconfiguration request message to a UE, this message containing the enhanced handover indication information.

5) The UE knows this handover process is an enhanced handover process in accordance with the step 4).

The internal handover of the MeNB in the TS36-300 10.1.2.8.2.1 involves an SCG change process, and can also be used by the SeNB to decide to adopt an enhanced handover process. A specific method is the same as the above method and will not be repeated there.

The steps focus on the method for deciding to adopt the enhanced handover process, and the data transmission, data receipt and data forwarding of eNBs are similar to those in FIGS. 10 and 11 and will not be described in details here.

The change process from an MeNB to an eNB in the TS36.300 10.1.2.8.5 can also be used by the target eNB to decide to adopt an enhanced handover process. A specific method comprises the following steps.

1) The target eNB decides to adopt an enhanced handover process.

2) The target eNB contains enhanced handover indication information in an RRC container of a handover request acknowledge message, and then transmits this message to a UE by a source MeNB.

3) There are following two ways for the source MeNB to know that an enhanced handover process is adopted. Way 1: The source MeNB parses the enhanced handover indication information in the RRC container in the handover request acknowledge message, and thus knows this handover process is an enhanced handover process. Way 2: The target eNB also contains the enhanced handover indication information in the handover request acknowledge message. According to the enhanced handover indication information in the handover request acknowledge message, without parsing the RRC container, the source MeNB can know that the target eNB decides to adopt the enhanced handover process.

4) The source MeNB informs an S-SeNB of the enhanced handover indication information through an SeNB release request. The S-SeNB continues transmitting data to the UE and receiving uplink data from the UE.

5) The source MeNB transmits an RRC reconfiguration request message to the UE, this message containing the enhanced handover indication information.

6) The UE knows this handover process is an enhanced handover process in accordance with the step 5).

The steps focus on the method for deciding to adopt the enhanced handover process, and the data transmission, data receipt and data forwarding of eNBs are similar to those in FIGS. 10 and 11 and will not be described in details here.

The change process from an eNB to an MeNB in the TS36.300 10.1.2.8.7 can also be used by a target MeNB to decide to adopt an enhanced handover process. A specific method comprises the following steps.

1) The target MeNB decides to adopt an enhanced handover process. The target MeNB decides to adopt the enhanced handover process upon receiving a handover request message.

2) The target MeNB informs a T-SeNB of the enhanced handover indication information through an SeNB addition request message.

3) The T-SeNB contains the enhanced handover indication information in an RRC container of an SeNB addition request acknowledge message. The target MeNB contains the enhanced handover indication information in an RRC container of the handover request acknowledge message, and then transmits this message to a UE via a source eNB. Or, the target MeNB directly contains the enhanced handover indication information in the RRC container of the handover request acknowledge message, and does not contain the enhanced handover indication information in the RRC container of the SeNB addition request acknowledge message.

4) The source eNB transmits an RRC reconfiguration request message to the UE, this message containing the enhanced handover indication information.

5) The UE knows this handover process is an enhanced handover process in accordance with the step 4).

The steps focus on the method for deciding to adopt the enhanced handover process, and the data transmission, data receipt and data forwarding of eNBs are similar to those in FIGS. 10 and 11 and will not be described in details here.

The change process from an eNB to an MeNB in the TS36.300 10.1.2.8.7 can also be used by a T-SeNB to decide to adopt an enhanced handover process. A specific method comprises the following steps.

1) The T-SeNB decides to adopt an enhanced handover process. The target MeNB decides to adopt the enhanced handover process upon receiving an SeNB addition request message.

2) The T-SeNB contains the enhanced handover indication information in an RRC container of an SeNB addition request acknowledge message. The target MeNB contains the enhanced handover indication information in an RRC container of a handover request acknowledge message, and then transmits this message to a UE via a source eNB. Or, the T-SeNB informs the target MeNB of the enhanced handover indication information through the SeNB addition request acknowledge message, and the target MeNB contains the enhanced handover indication information in the RRC container of the handover request acknowledge message while the T-SeNB does not contain the enhanced handover indication information in the RRC container of the SeNB addition request acknowledge message. There are following two ways to indicate the source eNB that an enhance handover process is adopted.

Way 1: The source eNB parses the enhanced handover indication information in the RRC container of the handover request acknowledge message, and thus knows this handover process is an enhanced handover process.

Way 2: By containing the enhanced handover indication information in an X2 access layer message of the SeNB addition request acknowledge and the handover request acknowledge, without parsing the RCC container in the handover request acknowledge message, the source eNB is indicated that an enhanced handover process is adopted.

3) The source eNB transmits an RRC reconfiguration request message to a UE, this message containing the enhanced handover indication information.

4) The UE knows this handover process is an enhanced handover process in accordance with the step 3).

The steps focus on the method for deciding to adopt the enhanced handover process, and the data transmission, data receipt and data forwarding of eNBs are similar to those in FIGS. 10 and 11 and will not be described in details here.

A scenario of performing handover between different MeNBs without changing an SeNB in the TS36.300 10.1.2.8.8 can also be used by a target MeNB to decide to adopt an enhanced handover process. A specific method is a combination of the change process from an MeNB to an eNB in the TS36.300 10.1.2.8.5 and the change process from an eNB to an MeNB in the TS36.300 10.1.2.8.7, and will not be repeated here.

Corresponding to the first specific embodiment, an embodiment of the present invention further provides an eNB equipment which is a source eNB, comprising: a first transmitting module, a first processing module and a first receiving module, wherein:

the first transmitting module is configured to: transmit a handover request message to a target eNB; transmit an RRC connection reconfiguration message to a UE, and continue transmitting downlink data to the UE; and, transmit an SN status transfer to the target eNB, and start to forward data to the target eNB;

the first receiving module is configured to: continue receiving uplink data from the UE; receive a data transmission stopping indication transmitted after the UE is synchronized to the target eNB and indicate the first processing module to perform processing; and, receive a UE context release message transmitted by the target eNB; and the first processing module is configured to, under an indication from the receiving module, control the first transmitting module to stop transmitting the downlink data to the UE and control the first receiving module to stop receiving the uplink data from the UE.

Corresponding to the first specific embodiment, an embodiment of the present invention further provides an eNB equipment which is a target eNB, comprising: a second transmitting module and a second receiving module, wherein:

the second receiving module is configured to: receive a handover request message transmitted by a source eNB; receive an RRC connection reconfiguration message transmitted to a UE by the source eNB; receive an RRC connection reconfiguration completion message transmitted by the UE; and receive a path handover request response message transmitted by an MME; and the second transmitting module is configured to: transmit a handover request acknowledge message to the source eNB; transmit, by a target eNB, a data transmission stopping indication to the source eNB after the UE is synchronized to the target eNB; transmit a path request message to the MME; and transmit a UE context release message to the source eNB.

Corresponding to the second specific embodiment, an embodiment of the present invention further provides an eNB equipment which is a source eNB, comprising: a third transmitting module, a third processing module and a third receiving module, wherein:

the third transmitting module is configured to: transmit a handover request message to a target eNB; transmit an RRC connection reconfiguration message to a UE, and continue transmitting downlink data to the UE; and, transmit an SN status transfer to the target eNB, and start to forward data to the target eNB;

the third receiving module is configured to: receive a handover request acknowledge message transmitted by the target eNB, and continue receiving uplink data from the UE; receive a data transmission stopping indication transmitted by the target eNB after receiving an RRC connection reconfiguration completion message and indicates the third processing module to perform processing; and, receive a UE context release message transmitted by the target eNB; and the third processing module is configured to, under an indication from the third receiving module, control the transmitting module to stop transmitting the downlink data to the UE and control the third receiving module to stop receiving the uplink data from the UE.

Corresponding to the second specific embodiment, an embodiment of the present invention further provides an eNB equipment which is a target eNB, comprising: a fourth transmitting module and a fourth receiving module, wherein:

the fourth transmitting module is configured to: transmit a handover request acknowledge message to a source eNB; transmit a data transmission stopping indication to the source eNB; transmit a path handover request message to an MME; and transmit a UE context release message to the source eNB; and the fourth receiving module is configured to: receive a handover request message transmitted by the source eNB; receive an RRC connection reconfiguration message transmitted to the UE by the source eNB; receive an RRC connection reconfiguration completion message transmitted by the UE; and receive a path handover request response message transmitted by the MME.

The foregoing description merely shows preferred embodiments of the present invention and is not intended to limit the present invention. Any modification, equivalent replacement or improvement made within the spirit and principle of the present invention shall fall into the protection scope of the present invention.

The invention claimed is:

1. A method performed by a first base station in a wireless communication system, the method comprising:
receiving, from a user equipment (UE), UE capability information including first information;
transmitting, to a second base station, a handover request message including information to request the second base station to add second information to a handover request acknowledge message;
receiving, from the second base station, the handover request acknowledge message including the second information; and
transmitting, to the UE, a radio resource control (RRC) connection reconfiguration message including the second information, wherein the first information indicates whether a connection between the first base station and the UE is maintained after a transmission of the RRC connection reconfiguration message before a first transmission on a random access channel (RACH) from the UE to the second base station is performed, and wherein the second information indicates whether the UE continues a downlink reception or an uplink transmission with the first base station after the transmission of the RRC connection reconfiguration message before the first transmission on the RACH.

2. The method of claim 1, wherein transmitting the handover request message further comprises:

transmitting, to the second base station, the handover request message including the information based on the first information included in the UE capability information.

3. The method of claim 1, further comprising:

transmitting, to the second base station, a sequence number status transfer message; and forwarding, to the second base station, downlink data and uplink data.

4. A method performed by a second base station in a wireless communication system, the method comprising:

receiving, from a first base station, a handover request message including information to request the second base station to add second information to a handover request acknowledge message; and transmitting, to the first base station, the handover request acknowledge message including the second information, wherein a radio resource control (RRC) connection reconfiguration message including the second information is transmitted to a user equipment (UE), wherein the handover request message includes the information based on first information included in a UE capability message, the first information indicating whether a connection between the first base station and the UE is maintained after a transmission of the RRC connection reconfiguration message before a first transmission on a random access channel (RACH) from the UE to the second base station is performed, and wherein the second information indicates whether the UE continues a downlink reception or an uplink transmission with the first base station after the transmission of the RRC connection reconfiguration message before the first transmission on the RACH.

5. The method of claim 4, further comprising:

receiving, from the first base station, a sequence number status transfer message; and receiving, from the first base station, downlink data and uplink data.

6. A method performed by a user equipment (UE) in a wireless communication system, the method comprising:

transmitting, to a first base station, UE capability information including first information; and receiving, from the first base station, a radio resource control (RRC) connection reconfiguration message including second information, wherein the first information indicates whether a connection between the first base station and the UE is maintained after a transmission of the RRC connection reconfiguration message before a first transmission on a random access channel (RACH) from the UE to a second base station is performed, wherein the second information indicates whether the UE continues a downlink reception or an uplink transmission with the first base station after the transmission of the RRC connection reconfiguration message before the first transmission on the RACH, wherein the RRC connection reconfiguration message is received after a handover request message including information to request the second base station to add the second information to a handover request acknowledge message is transmitted from the first base station to the second base station, and wherein the handover request acknowledge message including the second information is transmitted from the second base station to the first base station.

7. The method of claim 6, further comprising:

receiving, from the first base station, downlink data, and transmitting, to the first base station, uplink data after the UE receives the RRC connection reconfiguration message and before the UE performs the first transmission on the RACH to the second base station.

8. A first base station in a wireless communication system, the first base station comprising:

a transceiver; and a controller configured to:

receive, from a user equipment (UE) via the transceiver, UE capability information including first information, transmit, to a second base station via the transceiver, a handover request message including information to request the second base station to add second information to handover request acknowledge message;

receive, from the second base station via the transceiver, the handover request acknowledge message including the second information; and transmit, to the UE via the transceiver, a radio resource control (RRC) connection reconfiguration message including the second information, wherein the first information indicates whether a connection between the first base station and the UE is maintained after a transmission of the RRC connection reconfiguration message before a first transmission on a random access channel (RACH) from the UE to the second base station is performed, and wherein the second information indicates whether the UE continues a downlink reception or an uplink transmission with the first base station after the transmission of the RRC connection reconfiguration message before the first transmission on the RACH.

9. The first base station of claim 8, wherein the controller is configured to:

transmit, to the second base station via the transceiver, the handover request message including the information based on the first information included in the UE capability information.

10. The first base station of claim 8, wherein the controller is configured to:

transmit, to the second base station via the transceiver, a sequence number status transfer message; and forward, to the second base station via the transceiver, downlink data and uplink data.

11. A second base station in a wireless communication system, the second base station comprising:

a transceiver; and a controller configured to:

receive, from a first base station via the transceiver, a handover request message including information to request the second base station to add second information to a handover request acknowledge message, transmit, to the first base station via the transceiver, the handover request acknowledge message including the second information, wherein a radio resource control (RRC) connection reconfiguration message including the second information is transmitted to a user equipment (UE), wherein the handover request message includes the information based on first information included in a UE capability message, the first information indicating whether a connection between the first base station and the UE is maintained after a transmission of the RRC connection reconfiguration message before a first transmission on a random access channel (RACH) from the UE to the second base station is performed, and wherein the second information indicates whether the UE continues a downlink reception or an uplink transmission with the first base station after the transmission of the RRC connection reconfiguration message before the first transmission on the RACH.

12. The second base station of claim 11, wherein the controller is configured to:

receive, from the first base station via the transceiver, a sequence number status transfer message; and receive, from the first base station via the transceiver, downlink data and uplink data.

13. A user equipment (UE) in a wireless communication system, the UE comprising:

a transceiver; and a controller configured to:

transmit, to a first base station via the transceiver, UE capability information including first information; and receive, from the first base station via the transceiver, a radio resource control (RRC) connection reconfiguration message including second information, wherein the first information indicates whether a connection between the first base station and the UE is maintained after a transmission of the RRC connection reconfiguration message before a first transmission on a random access channel (RACH) from the UE to a second base station is performed, wherein the second information indicates whether the UE continues a downlink reception or an uplink transmission with the first base station after the transmission of the RRC connection reconfiguration message before the first transmission on the RACH, wherein the RRC connection reconfiguration message is received after a handover request message including information to request the second base station to add the second information to a handover request acknowledge message is transmitted from the first base station to the second base station, and wherein the handover request acknowledge message including the second information is transmitted from the second base station to the first base station.

14. The UE of claim 13, wherein the controller is configured to:

receive, from the first base station via the transceiver, downlink data, and transmit, to the first base station via the transceiver, uplink data after the UE receives the RRC connection reconfiguration message and before the UE performs the first transmission on the RACH to the second base station.

* * * * *